(12) United States Patent
Ersepke et al.

(10) Patent No.: US 12,467,845 B2
(45) Date of Patent: Nov. 11, 2025

(54) CLAMPS FOR OPERABLY COUPLING AN OPTICAL COMPONENT TO A MOUNTING BLOCK, AND METHODS AND SYSTEMS FOR USING THE SAME

(71) Applicant: Becton, Dickinson and Company, Franklin Lakes, NJ (US)

(72) Inventors: Jason Bradley Ersepke, San Jose, CA (US); Andrew Saul Klassen, San Jose, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 503 days.

(21) Appl. No.: 17/867,278

(22) Filed: Jul. 18, 2022

(65) Prior Publication Data
US 2023/0053122 A1    Feb. 16, 2023

Related U.S. Application Data

(60) Provisional application No. 63/231,461, filed on Aug. 10, 2021.

(51) Int. Cl.
*G01N 15/1434* (2024.01)
*G01N 15/10* (2024.01)
*G02B 7/182* (2021.01)

(52) U.S. Cl.
CPC ......... *G01N 15/1434* (2013.01); *G02B 7/182* (2013.01); *G01N 2015/1006* (2013.01)

(58) Field of Classification Search
None
See application file for complete search history.

(56) References Cited

U.S. PATENT DOCUMENTS

| 4,660,971 | A | | 4/1987 | Sage et al. |
| 6,098,947 | A | * | 8/2000 | Kerschner ............. H04N 1/107 |
| | | | | 248/468 |
| 7,092,083 | B2 | | 8/2006 | Chadwick et al. |
| 8,742,325 | B1 | | 6/2014 | Droz et al. |
| 2008/0225255 | A1 | | 9/2008 | Margeson et al. |
| 2014/0111849 | A1 | | 4/2014 | Xuegong et al. |
| 2016/0058934 | A1 | | 3/2016 | Strohhofer et al. |
| 2016/0284525 | A1 | | 9/2016 | Katzinger et al. |
| 2018/0321463 | A1 | | 11/2018 | Staley |
| 2019/0353992 | A1 | * | 11/2019 | Huang ................... G02B 7/02 |
| 2020/0249551 | A1 | * | 8/2020 | Pan .................. G02B 27/0006 |
| 2022/0397513 | A1 | | 12/2022 | Klassen et al. |

FOREIGN PATENT DOCUMENTS

| CN | 212540319 | | 2/2021 |
| EP | 3593188 A1 | | 1/2020 |
| WO | WO2003021241 A1 | | 3/2003 |
| WO | WO2012068416 A1 | | 5/2012 |
| WO | WO-2014067250 A1 | * | 5/2014 ............ G02B 7/182 |
| WO | WO2018165019 A1 | | 9/2018 |

* cited by examiner

*Primary Examiner* — Rufus L Phillips
(74) *Attorney, Agent, or Firm* — Bret E. Field; BOZICEVIC, FIELD & FRANCIS LLP

(57) ABSTRACT

Clamps for operably coupling one or more optical components to a mounting block are provided. Clamps of interest include a frame and one or more flexure tabs attached to the frame. Light detection modules and systems including one or more clamps are also provided. Aspects of the disclosure additionally include methods for analyzing a sample and assembling a light detection module.

16 Claims, 12 Drawing Sheets

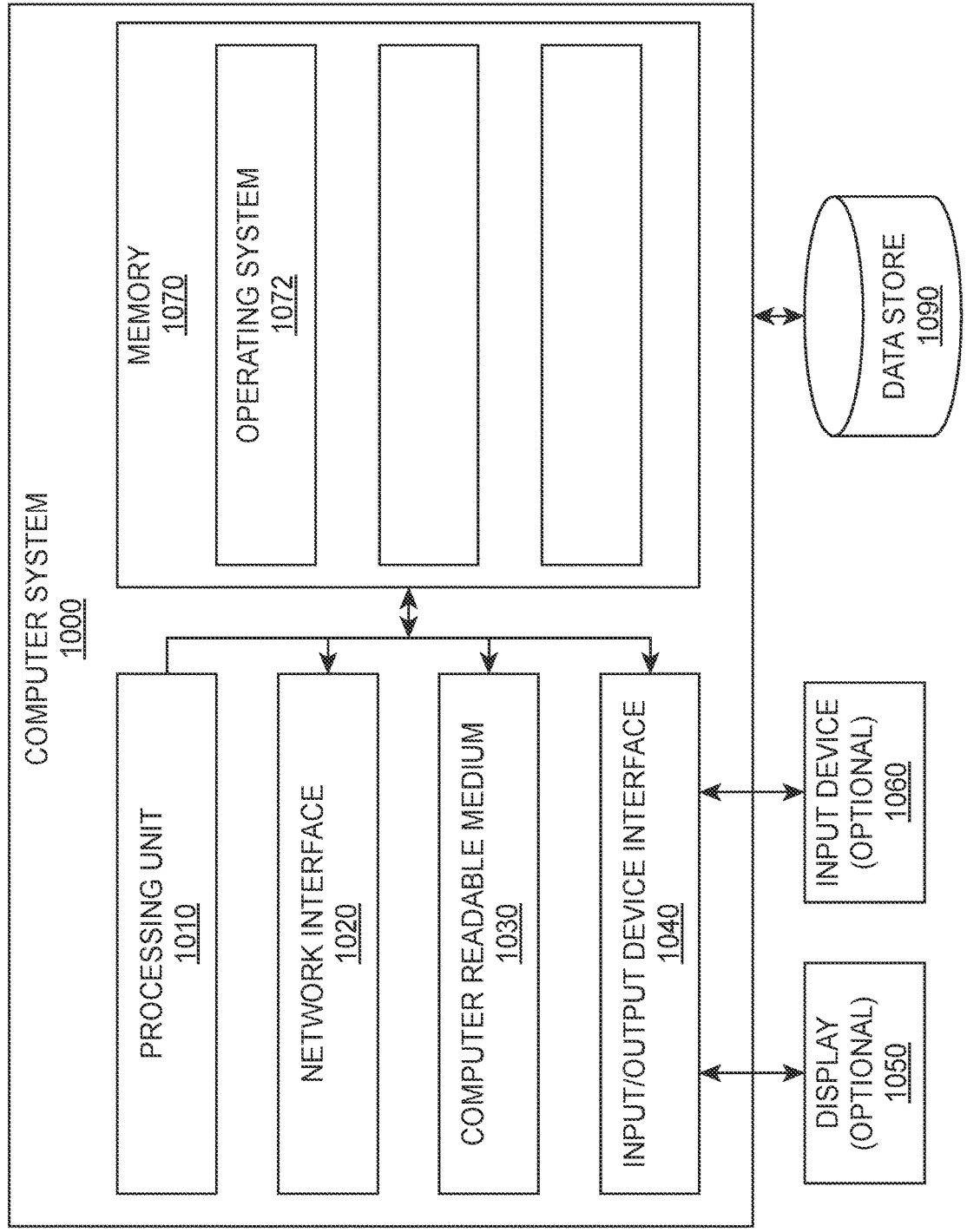

CLAMPS FOR OPERABLY COUPLING AN OPTICAL COMPONENT TO A MOUNTING BLOCK, AND METHODS AND SYSTEMS FOR USING THE SAME

CROSS-REFERENCE TO RELATED APPLICATION

Pursuant to 35 U.S.C. § 119 (e), this application claims priority to the filing date of U.S. Provisional Patent Application Ser. No. 63/231,461 filed Aug. 10, 2021; the disclosure of which application is incorporated herein by reference in their entirety.

INTRODUCTION

The characterization of analytes in biological fluids has become an important part of biological research, medical diagnoses and assessments of overall health and wellness of a patient. Detecting analytes in biological fluids, such as human blood or blood derived products, can provide results that may play a role in determining a treatment protocol of a patient having a variety of disease conditions.

Particle analysis (e.g., flow cytometry) is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary and may include one or more broad spectrum lamps, light emitting diodes as well as single wavelength lasers. The light source is aligned with the flow stream and an optical response from the illuminated particles is collected and quantified.

The parameters measured using a particle analyzer typically include light at the excitation wavelength scattered by the particle in a narrow angle along a mostly forward direction, referred to as forward-scatter (FSC), the excitation light that is scattered by the particle in an orthogonal direction to the excitation laser, referred to as side-scatter (SSC), and the light emitted from fluorescent molecules or fluorescent dye. Different cell types can be identified by their light scatter characteristics and fluorescence emissions resulting from labeling various cell proteins or other constituents with fluorescent dye-labeled antibodies or other fluorescent probes. Forward-scattered light, side-scattered light and fluorescent light is detected by photodetectors that are positioned within the particle analyzer.

In order to reduce unwanted noise in collected signal, optical components (e.g., dichroic mirrors, bandpass filters, beam splitters or the like) are often arranged such that they remain immobile with respect to other elements of a particle analyzer. Conventional approaches for immobilizing the optical components have employed optical adhesives. In such approaches, a risk must be managed with respect to the unintended application of adhesive to optical surfaces and outgassing that may damage optical components or compromise detected signals. Other conventional approaches have involved a plate configured to pivot on pins. However, such plates are designed to mount optical components with a nominal thickness and consequently do not account for thickness variation. This results in thicker filters receiving pressure from the plate while thinner filters do not receive the same pressure and become loose.

SUMMARY

Because prior solutions for securing optical components contribute to the damage and/or misalignment of the optical components, the inventors have realized that devices, systems and methods for operably coupling an optical component are required.

Aspects of the invention include clamps for operably coupling an optical component to a mounting block. Clamps of interest include a frame and a flexure tab attached to the frame. In certain cases, the flexure tab includes a bent portion for contacting the optical component. In some embodiments, the clamp includes a plurality of flexure tabs, such as where the number of flexure tabs in the plurality of flexure tabs ranges from 2 to 12 (e.g., 10). In certain instances, a first subset of flexure tabs is attached to a top portion of the frame and a second subset of flexure tabs is attached to a bottom portion of the frame. Adjacent flexure tabs may be separated by any convenient distance, such as where adjacent flexure tabs are separated by a distance ranging from 2 mm to 25 mm. The frame of the clamp may have any convenient shape, such as where the frame is rectangular or where the frame is square. In certain cases, the height of the frame ranges from 10 mm to 50 mm and the width of the frame ranges from 20 mm to 100 mm. In some embodiments, flexure tabs in the plurality of flexure tabs located adjacent to a corner of the frame are configured to contact a smaller surface of the optical component relative to neighboring flexure tabs. The clamp may be composed of any convenient material (e.g., metal, stainless steel). In some instances, clamps additionally include a cutout for preventing the obscuration of light exiting the optical component. A clamp of the present disclosure may, in some cases, include an attachment mechanism configured to secure the clamp to the mounting block, such as an opening in the frame configured to receive a screw. In certain cases, clamps include a plurality of openings, such as where the number of openings ranges from 2 to 8 (e.g., 8). The clamp described herein may be configured to operably couple any suitable number of optical components to a mounting block. In some cases, the clamp is configured to operably couple a single optical component to a mounting block. In other cases, the clamp is configured to operably couple a plurality of optical components, such as where the number of optical components ranges from 2 to 8, including 2 to 6.

Aspects of the invention additionally include light detection modules having a mounting block, an optical component for modulating a beam of light, and a clamp operably coupling the optical component to the mounting block. Clamps of interest in the subject light detection modules include a frame and one or more flexure tabs attached to the frame (e.g., as described above). Any convenient optical component may be employed in the subject light detection modules, such as a mirror (e.g., an elongated mirror or a dichroic mirror). In certain embodiments, the optical component is configured to pass light having a predetermined spectral range. The light detection modules described herein may include any suitable number of optical components. In some cases, light detection modules include a clamp for operably coupling a single optical component to a mounting block. In other cases, the clamp is configured to operably couple a plurality of optical components, such as where the number of optical components ranges from 2 to 8, including 2 to 6 (e.g., 4). In some embodiments, light detection modules include a plurality of mounting blocks and a clamp operably coupling an optical component to each mounting block in the plurality of mounting blocks (i.e., such that each mounting block is associated with a distinct clamp). In such embodiments, any convenient number of mounting blocks and clamps may be included, such as where the number of mounting blocks and clamps ranges from 2 to 4.

Elements of the disclosure additionally involve systems (e.g., flow cytometric systems) for analyzing a particle. Systems of interest include a light source and a light detection module. Light detection modules for use in the subject systems include a mounting block, an optical component for modulating a beam of light, and a clamp operably coupling the optical component to the mounting block. Clamps of interest in the subject systems include a frame and one or more flexure tabs attached to the frame (e.g., as described above). Any convenient number of light detection modules may be included in the subject systems. In some embodiments, systems include a single light detection module. In other embodiments, systems include a plurality of light detection modules, such as where the number of light detection modules ranges from 2 to 8, including from 2 to 6. Systems of interest may additionally include one or more optical components (e.g., wavelength separators). In certain instances, the wavelength separators are prisms, dichroic mirrors or diffraction gratings. In some embodiments, systems include three or more wavelength separators that are each configured to pass light having a predetermined spectral range and one or more light detection modules in optical communication with each wavelength separator having a plurality of photodetectors and an optical component that conveys light having a predetermined sub-spectral range to the photodetectors. Methods and kits for analyzing a sample in a particle analysis system and assembling a light detection module are also provided.

BRIEF DESCRIPTION OF THE FIGURES

The invention may be best understood from the following detailed description when read in conjunction with the accompanying drawings. Included in the drawings are the following figures:

FIG. 10 depicts a block diagram of a computing system according to certain embodiments.

DETAILED DESCRIPTION

Figure 1:
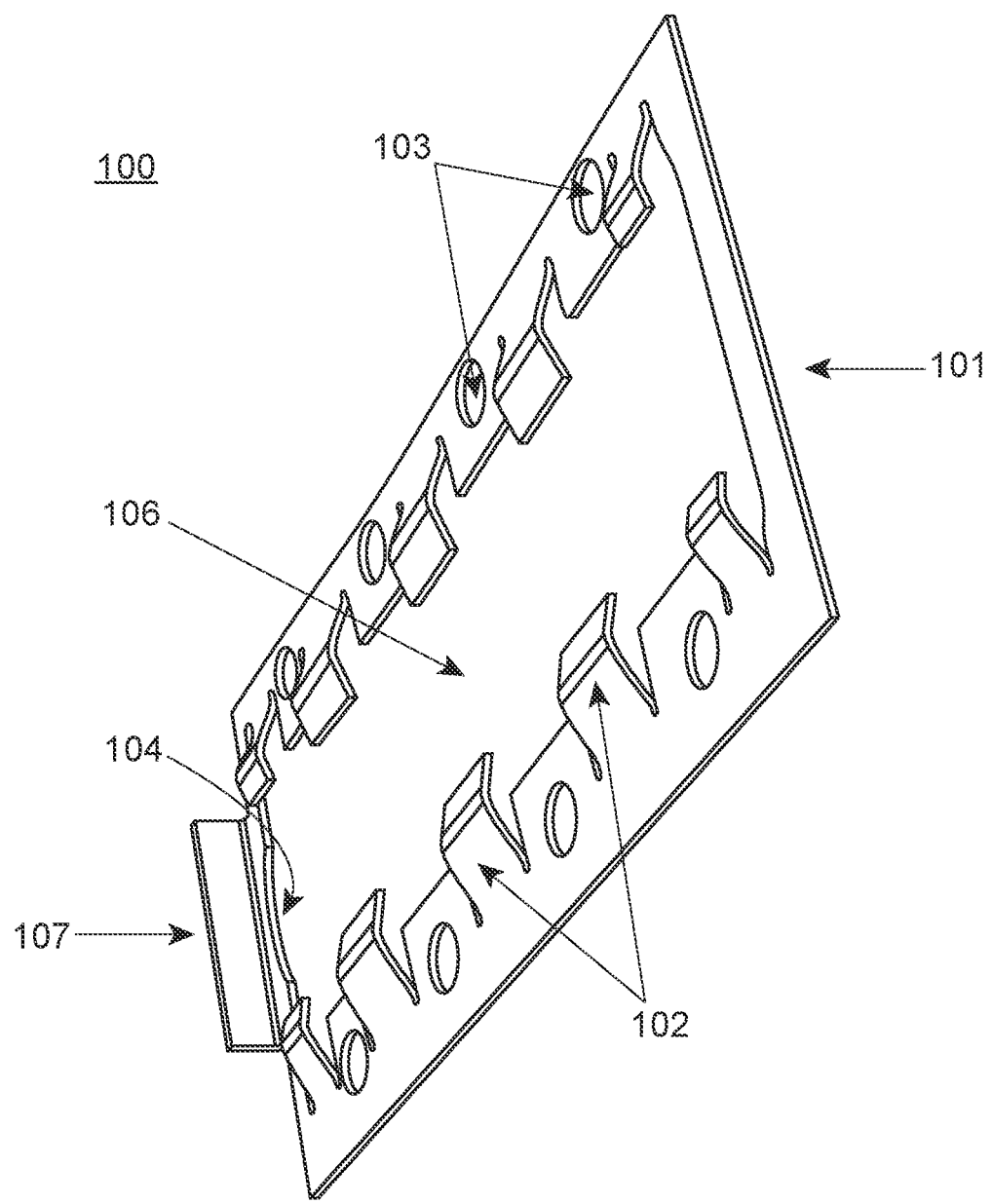
FIG. 1 depicts a clamp according to certain embodiments.

Clamps for operably coupling one or more optical components to a mounting block are provided. Clamps of interest include a frame and one or more flexure tabs attached to the frame. Light detection modules and systems including one or more clamps are also provided. Aspects of the disclosure additionally include methods for analyzing a sample and assembling a light detection module.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Clamps for Operably Coupling an Optical Component to a Mounting Block

As discussed above, aspects of the disclosure include clamps for operably coupling one or more optical components (e.g., dichroic mirrors, bandpass filters, beam splitters or the like) to a mounting block. By "operably coupling" it is meant associating the optical component with the mounting block such that the optical component does not move relative to the mounting block. Put another way, in some instances, operably coupling an optical component secures said optical component at an appropriate location relative to the mounting block and/or associated optics within a particle analyzer (e.g., flow cytometer). In certain cases, the subject clamps operably couple the optical component to the mounting block by applying an immobilizing force to the optical component. By "immobilizing force" it is meant a force that is sufficient to prevent the optical component(s) from altering position with respect to surrounding elements (e.g., mounting block). In some embodiments, the immobilizing force described herein is sufficient to prevent the position of the optical components(s) relative to surrounding elements from varying by 0.25 µm or more, such as 0.5 µm or more, such as 0.75 µm or more, such as 1 µm or more, such as 1.25 µm or more and including 1.5 µm or more. In certain cases, the immobilizing force is sufficient to prevent the position of the optical component(s) relative to surrounding elements from varying by 1 µm or more.

The subject clamps may be configured to operably couple any convenient number of optical components to a mounting block, such as where the number of optical components ranges from 2 to 8, including 2 to 6. In some instances, the clamps may be configured to couple 4 optical components to the mounting block. Where the clamps are configured to operably couple a plurality of optical components, the clamp is configured to apply the force equally with respect to each optical component. In other words, the force is not applied unevenly.

Aspects of the subject clamps include a frame and one or more flexure tabs for applying the immobilizing force to the optical components(s). As discussed herein, a "frame" refers to a structure that surrounds an open space through which incoming light can contact an optical component being operably coupled to a mounting block. In other words, the frame possesses an open space in its center through which light may be transmitted. The open space may possess any convenient shape, where shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In some embodiments, the open space is rectangular. In other embodiments, the open space is square. The open space may possess any convenient area. For example, in some cases, the area of the open space ranges from 80 mm$^2$ to 650 mm$^2$, such as 100 mm$^2$ to 500 mm$^2$.

The edges of the frame may possess any convenient shape, where shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In some embodiments, the frame is rectangular. In other embodiments, the frame is square. The frame may possess any suitable dimensions, e.g., height and width. For example, in some cases, the height of the frame ranges from 10 mm to 100 mm, such as 10 mm to 50 mm. Similarly, the width of the frame may range from 10 mm to 100 mm, such as 20 mm to 100 mm. The frame may also possess any convenient thickness (i.e., as measured by the distance separating the front surface of the frame to the back surface of the frame), such as where the thickness ranges from 1 to 50 mm, such as 5 to 25 mm. In some embodiments, the frame only includes a top portion and a bottom portion. In such embodiments, the top and bottom portions are independently affixed to a mounting block and are not connected to each other.

Clamps of interest additionally include a flexure tab attached to the frame. As described herein, a "flexure tab" refers to a protrusion from the frame of the clamp that is configured operably couple the optical component to the mounting block via elastic body deformation. In some cases, the flexure tab applies an immobilizing force after being deformed from its original shape following the positioning of the clamp on a mounting block containing the optical component(s). By "elastic body deformation" it is meant the proclivity of a deformed body to return to its original shape after the cause of deformation is removed. As such, the flexure arm is configured to "flex" out of its original shape and exert the immobilizing force as a result of the proclivity of the flexure arm to return to its original state. In certain embodiments, the movement of the flexure arm may be characterized by certain degrees of freedom. "Degrees of freedom" are discussed in their conventional sense to refer to the number of independent variables required to define the position of a rigid body. In certain cases, the subject flexure arm operates within a single degree of freedom. In such cases, the elastically deformed flexure tab is configured to flex outwards in a single direction, for example, a direction that is substantially (i.e., to a greater or lesser degree) orthogonal and/or normal with respect to the surface of the optical component. Following deformation, the flexure tab applies the immobilizing force in a direction that is opposite relative to the direction of flexure, i.e., such that the immobilizing force is applied to the optical component.

In some cases, the flexure tab possesses a bent portion (i.e., bend) for contacting the optical component. In such cases, the location of the bend is also the location at which the flexure tab is configured to contact the optical component. In some embodiments, the flexure tab possesses a "U-like" or "V-like" shape, where the inflection point of the "U" or "V" shape (i.e., the bend) is the location at which the flexure tab is configured to contact the optical component. In some instances, the bend is rounded. The bent portion, in such instances, does not possess sharp corners or edges that contact the optical component. In some embodiments, the bent portion of the flexure tab is shaped to impart minimal—including zero—damage or disfiguration to an optical component to which the clamp is applied. The flexure tab may be of any convenient size. For example, in some cases, the width of the flexure tab (i.e., as measured by the distance along the edge of the frame that is occupied by the flexure tab) ranges from 1 mm to 50 mm, such as 2 mm to 30 mm. The flexure tab may possess any convenient length (i.e., as measured from the frame to the bend). For example, in some cases, the length of the flexure tab ranges from 5 mm to 30 mm, such as 5 mm to 20 mm.

The clamp described herein may include any convenient number of flexure tabs. In certain cases, the subject clamp may include a single flexure tab. In other cases, the clamp includes a plurality of flexure tabs. For example, the number of flexure tabs in the plurality of flexure tabs may range from 2 to 14, such as 2 to 10, and including 2 to 8. In certain instances, the clamp includes 10 flexure tabs. The flexure tabs may be arranged with respect to the frame in any convenient manner. In some embodiments, the flexure tabs are attached to a top portion of the frame. In other embodiments, the flexure tabs are attached to a bottom portion of the frame. In still other embodiments, the flexure tabs are positioned on one or more side portions of the frame. In yet other embodiments, a first subset of flexure tabs is attached to a top portion of the frame, and a second subset of flexure tabs is attached to a bottom portion of the frame. In embodiments where flexure tabs are distributed between top and bottom portions of the frame, each of the top and bottom portions may have the same number or different numbers of flexure tabs attached thereto. Flexure tabs, in certain cases, are distributed equally among the top and bottom portions. For example, where the clamp includes 10 flexure tabs, 5 flexure tabs may be attached to the top portion and 5 flexure tabs may be attached to the bottom portion. Adjacent flexure tabs (i.e., flexure tabs positioned next to each other on the same portion of the frame) may be separated from each other by any convenient distance. For example, where the distance between flexure tabs is measured by the size of the gap separating the flexure tabs, adjacent flexure tabs may be separated by a distance ranging from 5 to 100 mm, such as 5 to 50 mm, and including 5 to 25 mm. In certain cases, the flexure tabs are positioned along the frame such that one or more flexure tabs are configured to apply immobilizing force to two optical components at once. In other words, one or more flexure tabs are positioned at junctures between neighboring optical components. In such cases, the flexure tabs apply the immobilizing force equally with respect to both optical components (i.e., so that one optical component is not subjected to more or less immobilizing force than another).

Where the clamp includes a plurality of flexure tabs, the characteristics of each flexure tab may be either the same or different. For example, in some cases, each flexure tab in the plurality of flexure tabs possesses a bent portion. In other cases, some flexure tabs possess a bent portion while others do not. In addition, each flexure tab may possess the same size or different sizes. In certain cases, flexure tabs in the plurality of flexure tabs located adjacent to a corner of the frame are configured to contact a smaller surface area of the optical component relative to neighboring flexure tabs. In such cases, the flexure tabs located adjacent to a corner of the frame possess a width that is smaller than the remainder of the flexure tabs, such as where the flexure tabs located adjacent to a corner of the frame possess a width that is 40%-60% smaller than the width of the remainder of the flexure tabs. In certain embodiments, the flexure tabs located adjacent to a corner of the frame possess a width that is 50% smaller than that of the remainder of the flexure tabs.

In some instances, the immobilizing force applied by the flexure tabs to the optical component(s) is determined by the following equation:

$$F=kx$$

where F is the force applied to the filters (N), k is the spring constant (N/mm), and x is the displacement of the flexure tab (mm). The spring constant k of the clamp can be assumed to be the stiffness of the flexure tab as it resembles a cantilever beam, and may therefore be determined by the following equation:

$$k = \frac{3EI}{L^3}$$

where E is the elastic modulus of the clamp material (Gpa), I is the second moment of area (mm$^4$), and L is the length of the flexure tab (i.e., measured in mm from the frame to the bend).

In some cases, the clamp is configured such that light incident on and/or reflecting from optical components immobilized by the clamp is not obscured. In other words, the frame and the flexure tabs of the clamp are shaped and positioned such that light received and emitted by optical components immobilized by the clamp remains unobstructed. In some embodiments, the frame includes one or more cutouts for preventing the obscuration of light incident on and/or exiting the optical component. The cutout described herein is a portion of the frame that is removed such that light entering and/or exiting the open space defined by the frame is not blocked or obscured. The cutout may possess any convenient shape, where shapes of interest include, but are not limited to: rectilinear cross sectional shapes, e.g., squares, rectangles, trapezoids, triangles, hexagons, etc., curvilinear cross-sectional shapes, e.g., circles, ovals, crescents as well as irregular shapes, e.g., a parabolic bottom portion coupled to a planar top portion. In some embodiments, the claimed cutout is crescent shaped. In certain cases, the frame includes a plurality of cutouts, such as where the number of cutouts ranges from 2 to 4. In some instances, the frame includes 2 cutouts. Where the frame includes a plurality of cutouts, each cutout may be the same or different. In one example where the frame includes 2 cutouts, the first cutout may possess a crescent shape while the second cutout may possess a rectangular shape.

Embodiments of the subject clamps additionally include an attachment mechanism for securing the clamp to a mounting block in a light detection module. By "securing" the clamp, it is meant ensuring that the clamp remains attached to the mounting block and preventing the unintentional disassociation of the clamp from said mounting block. In certain cases, the attachment mechanism includes an opening configured to receive a screw. In such cases, the opening may be positioned at any convenient location along the frame of the clamp. For example, the opening may be positioned on a top portion, side portion or bottom portion. The clamp may include any convenient number of openings. In some embodiments, the clamp includes a single opening.

In other embodiments, the clamp includes a plurality of openings, such as where the number of openings ranges from 2 to 12 openings, such as 2 to 8 and, including 2 to 10 openings. In some embodiments, the clamp includes 8 openings. In certain instances where the clamp includes a plurality of openings, a first subset of openings is positioned in a top portion of the frame while a second subset of openings is positioned in a bottom portion of the frame. In some cases, the flexure tabs are attached to the frame at locations between adjacent flexure tabs.

In other embodiments, the attachment mechanism includes a clip. Clips of interest may include a protrusion from the clamp that is configured to engage (e.g., in a mating relationship) with a complementarily sized groove in the mounting block. Where the clamp includes a clip, the clip may be configured to engage with the groove as the clamp is positioned on the detection module and, once engaged, prevent the clamp from being lifted off the mounting block. The subject clamps may include any convenient number of clips. In some instances, the clamps include a single clip configured to mate with a single groove in the mounting block. In additional embodiments, the clamp includes a plurality of clips, such as where the number of clips ranges from 2 to 4.

The subject clamps may be comprised of any convenient material. In certain instances, clamps include one or more metals including, for example, aluminum, titanium, brass, iron, lead, nickel, steel (e.g., stainless steel), copper, tin as well as combinations and alloys thereof. In some embodiments, the metal includes 301 half-hard stainless steel. In additional embodiments, clamps include one or more rigid plastic materials such as, for example, polycarbonates, polyvinyl chloride (PVC), polyurethanes, polyethers, polyamides, polyimides, among other polymeric plastic materials. In certain cases, the clamp includes a 3D printed polymer. Any convenient 3D printed polymer may be employed, such as, for example, acrylonitrile butadiene styrene (ABS), polylactic acid (PLA), acrylic styrene acrylonitrile (ASA), polyethylene terephthalate (PET), glycol-modified polyethylene terephthalate (PETG), polyaryletherketones (PAEK), polyetherimides (PEI), polypolycarbonate (PC), polypropylene, (PP), nylon as well as composites and hybrids thereof. Examples of suitable 3D printed polymers for use in the present clamps are commercially available under the trade name Ultem®. In some embodiments, the 3D printed polymer includes an epoxy material, such as EPX 82 produced by Carbon, Inc.

In additional embodiments, the clamp includes an injection-moldable polymer. Any convenient injection-moldable polymer may be employed. Injection-moldable polymers may include, but are not limited to: acrylonitrile butadiene styrene (ABS), polycarbonate (PC), aliphatic polyamides (PPA), polyoxymethylene (POM), polymethyl methacrylate (PMMA), polypropylene (PP), polybutylene terephthalate (PBT), polyphenylsulfone (PPSU), polyeteter ether ketone (PEEK) and polyetherimide (PEI).

In some embodiments, the clamp includes a glass-filled polymer (i.e. having glass fibers in a matrix of polymeric material). In such embodiments, any suitable polymer (e.g., such as those described above) may be combined with glass fibers to generate a glass filled polymer. For example, glass filled polymers of interest may include glass-filled nylon or glass-filled polyetherimide.

FIG. 1 depicts a clamp according to certain embodiments of the invention. As shown in FIG. 1, clamp 100 possesses a frame 101 surrounding an open space 106. The visible surface of frame 101 is configured to interface with a mounting block (not shown). Attached to frame 101 are a plurality of flexure tabs 102. In the example of FIG. 1, frame 101 includes 10 flexure tabs. Each flexure tab includes a bent portion configured to contact an optical component (not shown) when the clamp 100 is employed to operably couple the optical component to the mounting block. Flexure tabs closest to the corners of the frame 101 possess a smaller width and are configured to contact a smaller surface area of the wavelength separator. Frame 101 additionally includes a plurality of openings 103 configured to receive screws (i.e., for attaching clamp 100 to the mounting block). Frame 101 possesses crescent-shaped cutout 104 for preventing the obscuration of light, as well as clip 107 for securing the clamp to the mounting block.

Light Detection Modules

Aspects of the invention additionally include light detection modules having clamps fitted thereon for applying an immobilizing force to one or more optical components positioned within the light detection modules. As discussed herein, a "light detection module" refers to a modular unit possessing one or more photodetectors for detecting certain wavelengths of light. Light detection modules of interest additionally include one or more optical components operably coupled to one or more mounting blocks via clamps (such as those described above). By "optical component" it is meant an optical element having a flat surface that is configured to modulate an incident beam of light. By "modulation" it is meant an alteration in one or more properties of the light (e.g., wavelengths, direction, collimation, focus, etc.) In some cases, the optical component is reflective. For example, where it is desirable to reflect and/or redirect a beam of light, the optical component may include a mirror. In certain instances, the mirror is an elongated mirror (e.g., a mirror that is rectangular in shape). In certain instances, the optical component may be a wavelength separator, i.e., an optical component designed to pass light having certain properties (e.g., wavelengths) while blocking/absorbing or reflecting light having other properties (e.g., wavelengths). In some embodiments, the subject optical component is configured to pass certain wavelengths of light and absorb others. In other embodiments, the subject optical component is configured to pass certain wavelengths of light and reflect others. In addition to the above, optical components of interest include, but are not limited to, dichroic mirrors, lenses, diffraction gratings, bandpass filters, beam splitters or the like. In certain cases, the optical components are dichroic mirrors.

As discussed herein, a "mounting block" is a substrate to which one or more optical components may be operably coupled. In other words, the mounting block positions and secures an optical component within an optical system such that the optical component functions properly with respect to other elements of the system. The subject mounting block may have any convenient shape. In some instances, the mounting block is cuboid in shape. For example, in some embodiments, the mounting block may possess the shape of a square cube or a rectangular cube. In certain cases, such as where the optical components operably coupled to the mounting block are configured to pass certain wavelengths of light, the mounting block may include a hollow portion. In such cases, light passed by optical components may propagate through the mounting block and be emitted on the side of the mounting block opposite the side on which the optical components are operably coupled. The mounting block may possess an interior volume of any convenient size, such as where the mounting block possesses an interior volume ranging from 6,000 to 24,000 $mm^3$.

The subject light detection modules may include any convenient number of optical components and mounting blocks. In some cases, light detection modules of interest include a single optical component and a single mounting block. In such embodiments, a light detection module may include a single clamp for operably coupling the optical component to the mounting block. In other embodiments, the light detection module may include a plurality of optical components, a single mounting block and a single clamp for operably coupling the plurality of optical components to the mounting block. In such embodiments, the number of optical components in the plurality of optical components may range from, for example, 2 to 8, such as 2 to 6. In certain cases, the clamp operably couples 4 optical components to the mounting block. Where the clamps are configured to operably couple a plurality of optical components, the clamp is configured to apply the force equally with respect to each optical component. In other words, the force is not applied unevenly. In other cases, the light detection modules include a plurality of mounting blocks and a clamp operably coupling an optical component to each mounting block in the plurality of mounting blocks (i.e., a separate clamp associated with each mounting block). The subject light detection modules may include any suitable number of mounting blocks, such as where the number of mounting blocks ranges from 2 to 4. In some instances, light detection modules include 3 mounting blocks. Where the light detection modules include a plurality of mounting blocks, each mounting block may possess one optical component or a plurality of optical components (e.g., ranging from 2 to 8, such as 2 to 6) operably coupled thereto. In one example where a light detection module includes 3 mounting blocks, a first clamp operably couples a single optical component (e.g., wavelength separator) to a first mounting block, a second clamp operably couples a single elongated mirror to a second mounting block, and a third clamp operably couples a plurality of wavelength separators (e.g., 4) to a third mounting block.

Figure 2:
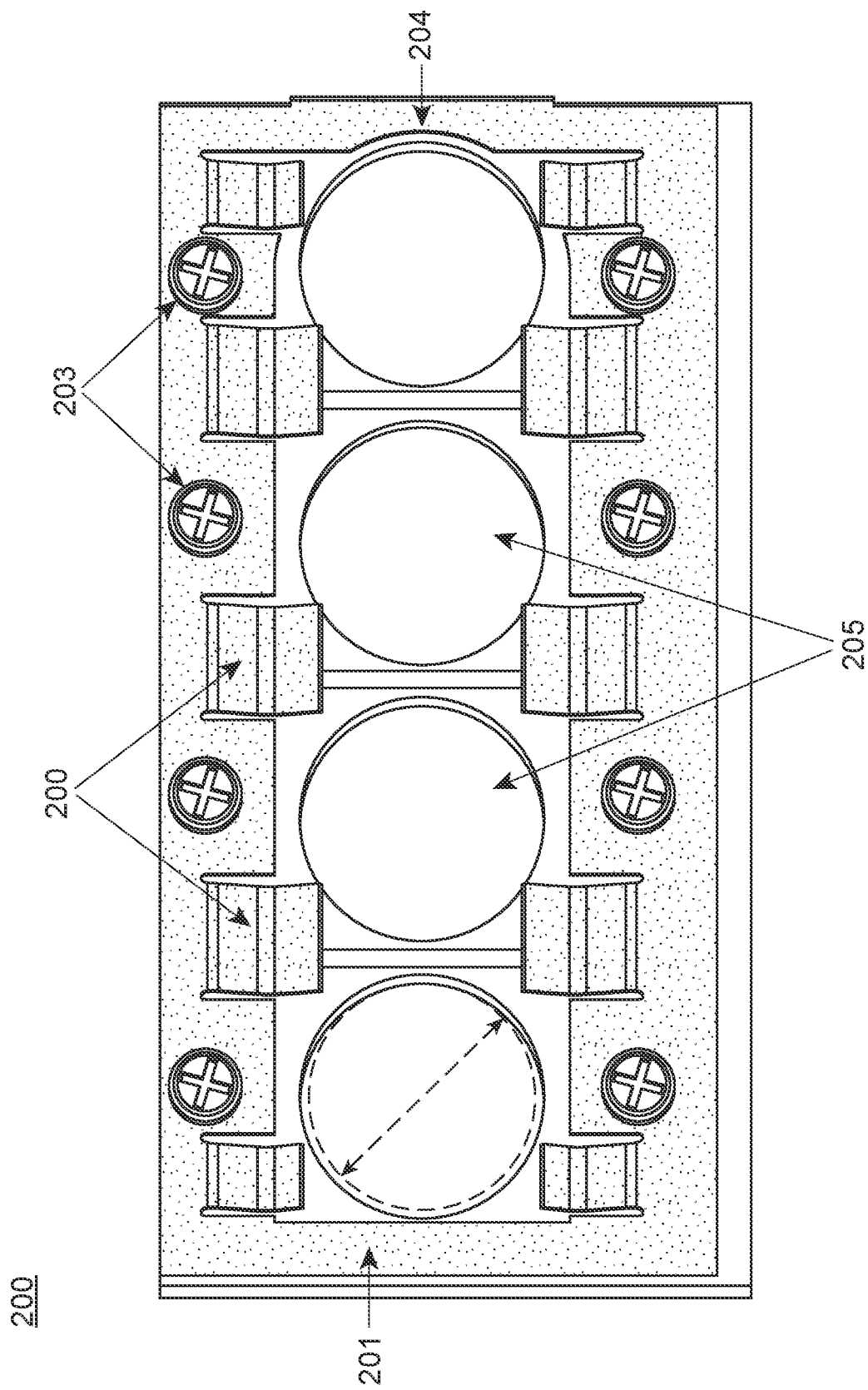
FIG. 2 depicts a clamp and optical components according to certain embodiments.

FIG. 2 depicts a clamp operably coupling optical components to a mounting block according to certain embodiments. As shown in FIG. 2, clamp 200 includes frame 201 and a plurality of (i.e., 10) flexure tabs 202 attached thereto. Flexure tabs 202 apply immobilizing force to a plurality of (i.e., 4) optical components 205, thereby preventing the movement of said components relative to the mounting block (located behind clamp 200 and optical components 205). Diameter 206 depicts the outer diameter of the beams of light modulated by each optical component in the plurality of optical components 205. Neither the frame nor the flexure tabs overlap any part of the circle defined by diameter 206, indicating that no part of the beam is obscured by clamp 200. To this end, frame 201 includes a cutout 204 for preventing the obscuration of light. Frame 201 additionally includes a plurality of (i.e., 8) openings 203 through which screws have been inserted for securing clamp 200 to the mounting block.

Figure 3A:
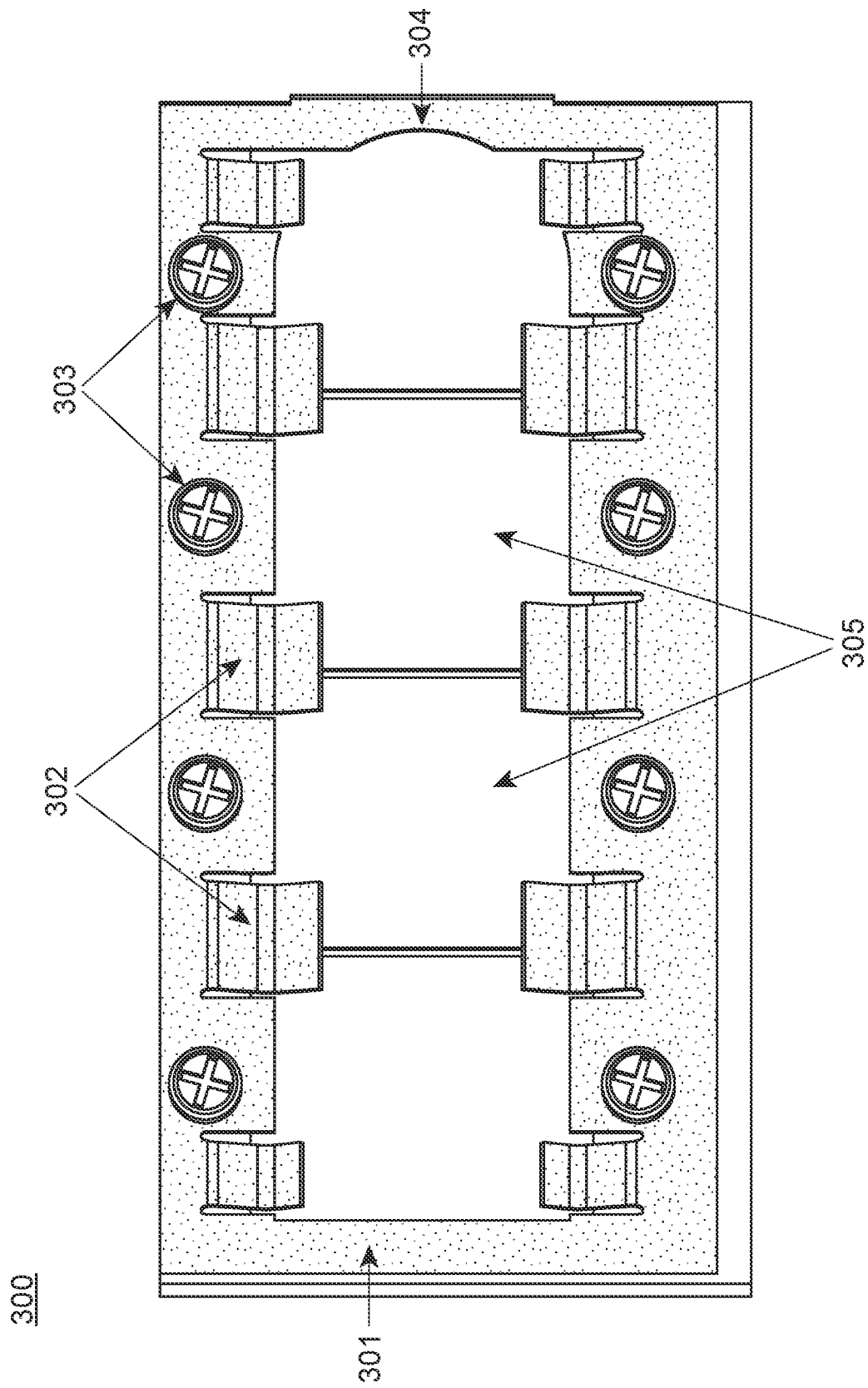
FIG. 3A-B depict alternate views of a clamp operably coupling a set of optical components to a mounting block.
Figure 3B:
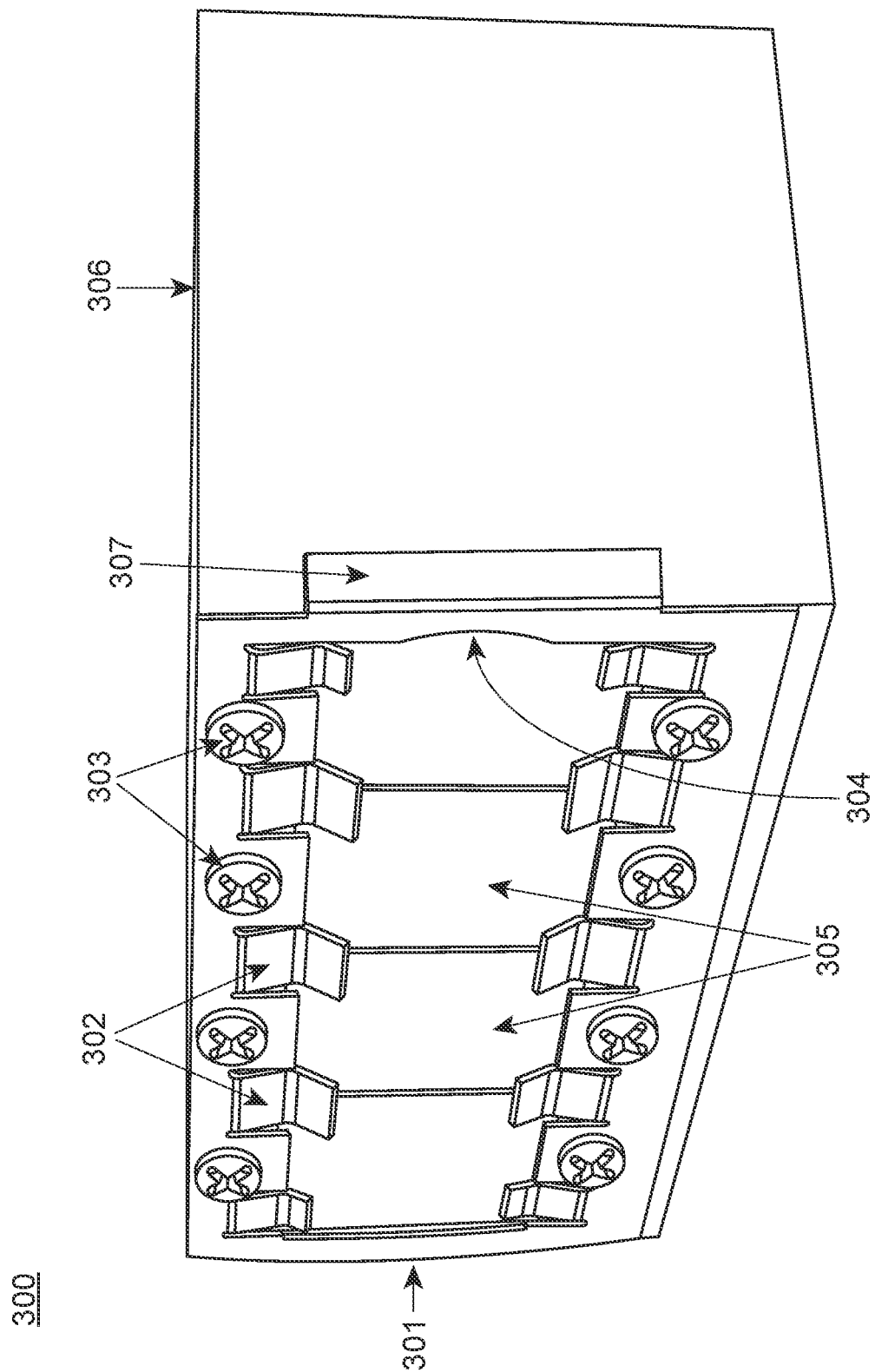

FIG. 3A-B depict alternate views of a clamp 300 operably coupling a set of optical components 305 to a mounting block. Clamp 300 includes frame 301 to which a plurality of (i.e., 10) flexure tabs 302 are attached. Frame 301 additionally includes a plurality of (i.e. 8) openings 303 through which screws have been inserted for securing clamp 300 to the mounting block 306 (shown in FIG. 3B). Cutout 304 is positioned in frame 301 for preventing the obscuration of light. In FIG. 3B, clip 307 for securing the clamp to the mounting block 306 is visible.

Figure 4:
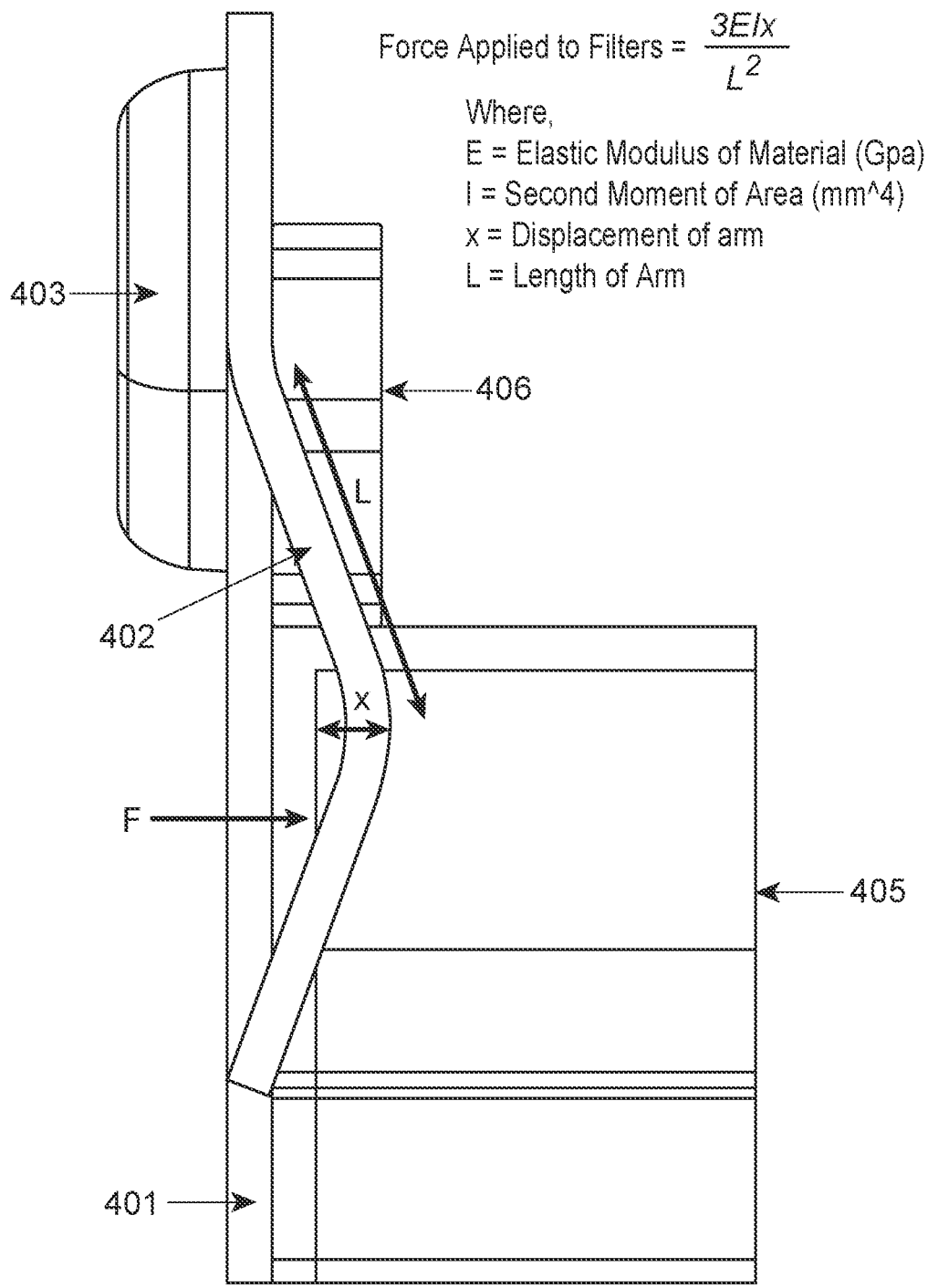
FIG. 4 depicts the application of an immobilizing force to an optical component via a clamp.

FIG. 4 depicts a profile view of the application of an immobilizing force to an optical component by a clamp. As shown in FIG. 4, Clamp 401 includes a flexure tab 402. Screw 403 secures clamp 401 to mounting block 406. When an optical component 405 is operably coupled to mounting block 406 via clamp 401, flexure tab 402 "flexes" and is displaced in a horizontal direction denoted by arrow x. As a result of the displacement, the flexure tab applies force F in the opposite direction to the wavelength separator 405.

In certain cases, the light detection modules described herein are light detection modules provided in U.S. application Ser. No. 17/159,453, the disclosure of which is incorporated by reference in its entirety. In such cases, the light detection modules are configured for use in a clustered wavelength division (CWD) light detection system and receive predetermined spectral ranges of light generated by a wavelength separator. In certain instances, the wavelength separator is a prism, diffraction grating, or dichroic mirror. In embodiments, light detection modules include a plurality of photodetectors and one or more additional optical components configured optically adjust light (e.g., pass light having a certain sub-spectral wavelength to photodetectors). In some embodiments, each optical component is configured to pass light having a sub-spectral range of from 5 nm to 50 nm to each photodetector, such as a sub-spectral range of about 20 nm to each photodetector. The photodetectors and optical components may be positioned in each light detection module along a single plane or along two or more parallel planes. In certain embodiments, the photodetectors and optical components are positioned in a polygonal configuration, such as a hexagonal, heptagonal or octagonal configuration in each light detection module.

Depending on the wavelengths of light passed from the wavelength separator to the light detection module (as described above), the one or more optical components in the light detection module may be configured to convey light having wavelengths that range from a first wavelength, Yi (in nanometers, nm) to a second wavelength Yn (in nanometers, nm) to the photodetectors. In some embodiments, the one or more optical components are configured to convey light having wavelengths that range from 100 nm to 1500 nm to the photodetectors, such as from 150 nm to 1450 nm, such as from 200 nm to 1400 nm, such as from 250 nm to 1350 nm, such as from 300 nm to 1300 nm, such as from 350 nm to 1250 nm, such as from 400 nm to 1200 nm, such as from 450 nm to 1150 nm, such as from 500 nm to 1100 nm, such as from 550 nm to 1050 nm and including propagating light having wavelengths that range from 600 nm to 1000 nm to the photodetectors.

In embodiments, the optical components in each light detection module are configured to convey a predetermined sub-spectral range of light, $Y_s$ (in nanometers, nm) to each photodetector. The predetermined sub-spectral ranges conveyed by each optical component may vary, where certain optical components of interest are configured to convey sub-spectral ranges of light that span from 5 nm to 50 nm, such as from 6 nm to 49 nm, such as from 7 nm to 48 nm, such as from 8 nm to 47 nm, such as from 9 nm to 46 nm and including from 10 nm to 45 nm. In certain embodiments, the optical component is configured to pass a spectral range of light that spans 20 nm.

In some embodiments, the optical components in each light detection module are in optical communication with each other, such as being positioned to convey light between each other. The optical components may be oriented with respect to each other in the light detection module (as referenced in an X-Z plane) at an angle ranging from 10° to 180°, such as from 15° to 170°, such as from 20° to 160°, such as from 25° to 150°, such as from 30° to 120° and including from 45° to 90°. In some instances, the optical components are positioned along a single plane. In other instances, the optical components are positioned along more than one plane. For example, the optical components may be positioned along two or more parallel planes, such as three or more, such as four or more and including five or more parallel planes. In certain instances, the optical components are arranged into a geometric configuration, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. In certain embodiments, the optical components are arranged in a hexagonal configuration. In other embodiments, the optical components are arranged in a heptagonal configuration.

Any convenient photodetector may be employed in the subject light detection modules. Photodetectors of interest may include, but are not limited to, optical sensors or photodetectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other photodetectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the photodetector is a photomultiplier tube. In other embodiments, the photodetector is an avalanche photodiode.

The light detection modules described herein may include any convenient number of photodetectors. In some cases, light detection modules include a single photodetector. In other embodiments, light detection modules include a plurality of photodetectors. For example, the light detection module may include a number of photodetectors ranging from 2 to 8, such as 2 to 6, and including 2 to 4. In some cases, light detection modules of interest include 4 photodetectors. In other cases, light detection modules include 6 photodetectors.

Where the subject light detection modules include a plurality of photodetectors, each photodetector may be the same, or the plurality of photodetectors may be a combination of different types of photodetector. For example, where the subject light detection modules include two photodetectors, in some embodiments the first photodetector is a CCD-type device and the second photodetector (or imaging sensor) is a CMOS-type device. In other embodiments, both the first and second photodetectors are avalanche photodiodes. In yet other embodiments, both the first and second photodetectors are CMOS-type devices. In still other embodiments, the first photodetector is an avalanche photodiode and the second photodetector is a photomultiplier tube (PMT). In still other embodiments, the first photodetector is a CMOS-type device and the second photodetector is a photomultiplier tube. In yet other embodiments, both the first and second photodetectors are photomultiplier tubes.

In certain cases, the subject light detection modules further include a printed circuit board (PCB). As is known in the art, printed circuit boards electrically connect multiple electronic components via conductive material positioned within a non-conductive substrate. In such cases, one or more components of the light detection module may be in electrical communication with the printed circuit board. For example, in some embodiments, light detection modules are arranged such that photodetector leads are connected to the printed circuit board (e.g., via soldering).

Embodiments of the subject light detection modules further include a detection block. Detection blocks of interest are configured to receive one or more photodetectors therein. The detection blocks described herein may be constructed from any convenient material. In some embodiments, detection blocks include a thermally conductive material. In certain embodiments, the thermally conductive material includes a metal, such as copper or aluminum. In certain cases, the detection block is manufactured from copper.

In embodiments, light detection modules include a thermoelectric cooler in contact with a bottom surface of detection block. The term "thermoelectric cooler" is used herein in its conventional sense to refer to a heat pump which transfers heat between the junction of two different surfaces (e.g., a "cool" surface and a "hot" surface) in response to the application of an electrical current. In certain embodiments, heat flux between the two different surfaces is generated by the Peltier effect and thermoelectric coolers of interest are Peltier heat pumps. In some embodiments, the two different surfaces (e.g. plates) of the thermoelectric cooler are formed from different materials (n-type semiconductors, p-type semiconductors), such as narrow band-gap semiconductors and heavy element materials having low thermal conductivity. For example, the surfaces of thermoelectric coolers of interest may be formed from semiconductors such as bismuth telluride, lead telluride, silicon germanium, bismuth-antimony alloys, and combinations thereof. In certain embodiments, thermoelectric coolers of interest include those described in U.S. Patent Publication No. 2004/0155251, U.S. Pat. Nos. 6,499,306; 4,581,898; 4,922,822; 5,409,547 and 2,984,077, the disclosures of which are incorporated herein by reference.

Figure 5:
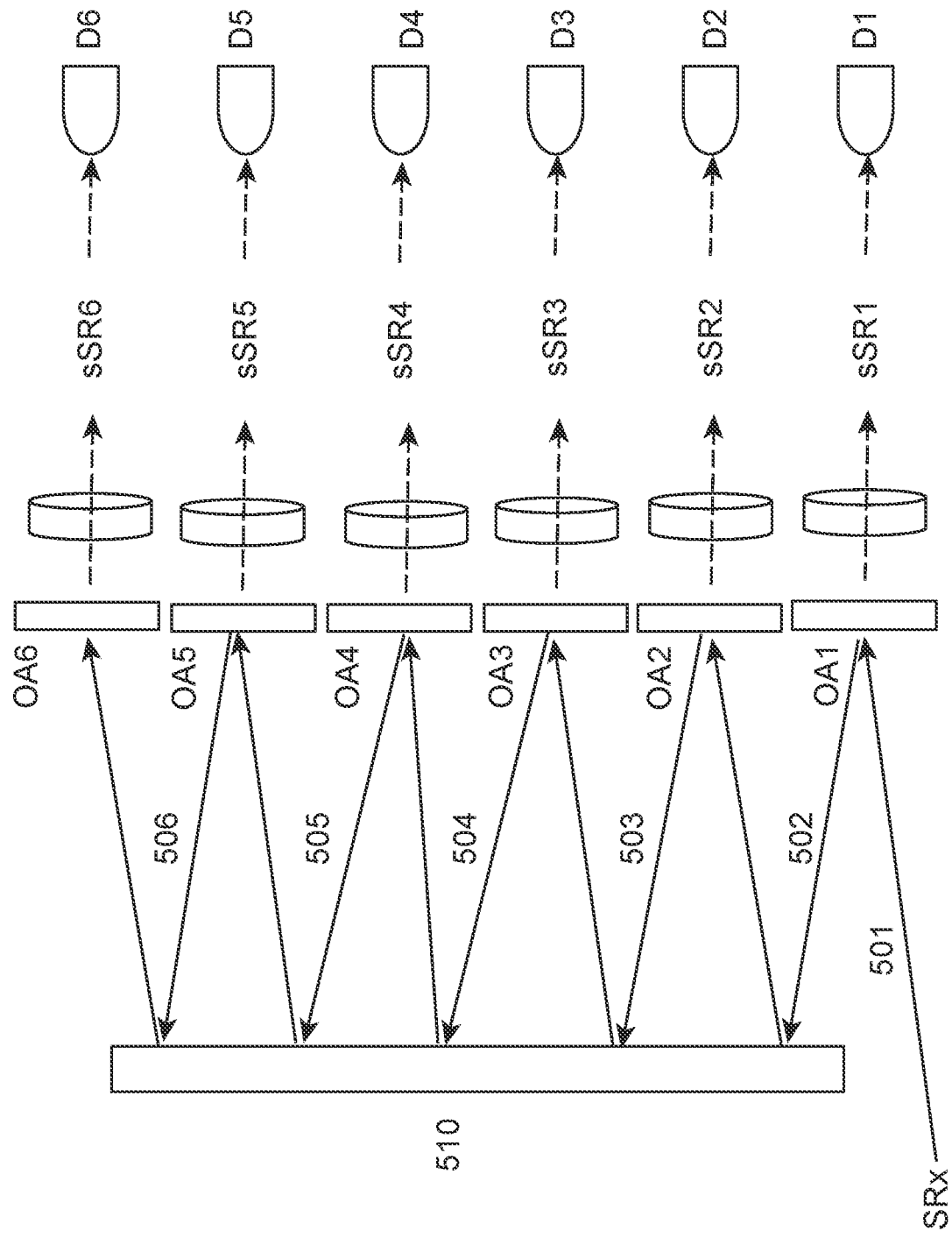
FIG. 5 depicts a schematic diagram of a light detection module according to certain embodiments.

FIG. 5 depicts components of a light detection module positioned along two parallel planes according to certain embodiments. A spectral range of light SRx from a wavelength separator having a set of wavelengths 501 (e.g., 360 nm to 480 nm) is conveyed to a first optical component OA1 configured to pass a first sub-spectral range of light sSR1 (e.g., 360 nm to 380 nm) and convey light having a set of wavelengths 502 (e.g., 380 nm to 480 nm) to a second optical component OA2. The light 502 is reflected by an elongated mirror 510 before it reaches the second optical component OA2. The first sub-spectral range of light sSR1 is conveyed to a first photodetector D1. The second optical component OA2 is configured to pass a second sub-spectral range of light sSR2 (e.g., 380 nm to 400 nm) and convey light having a set of wavelengths 503 (e.g., 400 nm to 480 nm) to a third optical component OA3. The second sub-spectral range of light sSR2 is conveyed to a second photodetector D2. The third optical component OA3 is configured to pass a third sub-spectral range of light sSR3 (e.g., 400 nm to 420 nm) and convey light having a set of wavelengths 504 (e.g., 420 nm to 480 nm) to a fourth optical component OA4. The third sub-spectral range of light sSR3 is conveyed to a third photodetector D3. The fourth optical component OA4 is configured to pass a fourth sub-spectral range of light sSR4 (e.g., 420 nm to 440 nm) and convey light having a set of wavelengths 505 (e.g., 440 nm to 480 nm) to a fifth optical component OA5. The fourth sub-spectral range of light sSR4 is conveyed to a fourth photodetector D4. The fifth optical component OA5 is configured to pass a fifth sub-spectral range of light sSR5 (e.g., 440 nm to 460 nm) and convey light having a set of wavelengths 506 (e.g., 460 nm to 480 nm) to a sixth optical component OA6. The fifth sub-spectral range of light sSR5 is conveyed to a fifth photodetector D5. The sixth optical component OA6 is configured to pass a sixth sub-spectral range of light sSR6 (e.g., 460 nm to 480 nm). The sixth sub-spectral range of light sSR6 is conveyed to a sixth photodetector D6. In this embodiment, light is conveyed along a sequential zig-zag light path. Light 502-506 is reflected by an elongated mirror 510 before it reaches a subsequent optical component (OA2-OA6, respectively).

One or more elements of the light detection module shown in FIG. 5 may be operably coupled by a clamp described herein. For example, in some cases, optical components OA1-OA6 may collectively be immobilized via a single appropriately sized clamp. In other cases, each of optical components OA1-OA6 may be immobilized by an individual clamp (i.e., such that there is one clamp per optical component). In still other cases, a first subset of optical components (e.g., OA1-OA3) are immobilized by a first clamp, and a second subset of optical components (e.g., OA4-OA6) are immobilized by a second clamp. While the preceding embodiments are provided as examples, any suitable combination of optical components and clamps may be employed, as desired. In certain embodiments, elongated mirror 510 is immobilized by a clamp.

Particle Analysis Systems

Aspects of the invention also include particle analysis systems. Systems of interest include optical components that are immobilized by one or more clamps (e.g., as described above). Particle analyzers of interest may include a flow cell for transporting particles in a flow stream and a light source for irradiating the particles in the flow stream at an interrogation point. The subject particle analyzers additionally include one or more photodetectors for detecting particle-modulated light. In embodiments, the particle analyzers include one or more light detection modules (e.g., as described above).

As discussed herein, a "flow cell" is described in its conventional sense to refer to a component, such as a cuvette, containing a flow channel having a liquid flow stream for transporting particles in a sheath fluid. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. In some embodiments, the flow cell is a stream-in-air flow cell in which light interrogation of the particles occurs outside of the flow cell (i.e., in free space).

In some cases, the flow stream is configured for irradiation with light from a light source at an interrogation point. The flow stream for which the flow channel is configured may include a liquid sample injected from a sample tube. In certain embodiments, the flow stream may include a narrow, rapidly flowing stream of liquid that is arranged such that linearly segregated particles transported therein are separated from each other in a single-file manner. The "interrogation point" discussed herein refers to a region within the flow cell in which the particle is irradiated by light from the light source, e.g., for analysis. The size of the interrogation point may vary as desired. For example, where 0 µm represents the axis of light emitted by the light source, the interrogation point may range from −100 µm to 100 µm, such as −50 µm to 50 µm, such as −25 µm to 40 µm, and including −15 µm to 30 µm.

After particles are irradiated in the flow cell, particle-modulated light may be observed. By "particle-modulated light" it is meant light that is received from the particles in the flow stream following the irradiation of the particles with light from the light source. In some cases, the particle-modulated light is side-scattered light. As discussed herein, side-scattered light refers to light refracted and reflected from the surfaces and internal structures of the particle. In additional embodiments, the particle-modulated light includes forward-scattered light (i.e., light that travels through or around the particle in mostly a forward direction). In still other cases, the particle-modulated light includes fluorescent light (i.e., light emitted from a fluorochrome following irradiation with excitation wavelength light).

As discussed above, aspects of the invention also include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 μm or greater increments, such as 0.05 μm or greater, such as 0.1 μm or greater, such as 0.5 μm or greater such as 1 μm or greater, such as 10 μm or greater, such as 100 μm or greater, such as 500 μm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

In some embodiments, the particle analysis systems described herein are clustered wavelength division (CWD) systems, such as those described in U.S. application Ser. No. 17/159,453, the disclosure of which is incorporated by reference in its entirety. Particle analysis systems according to such embodiments include one or more wavelength separators (e.g., three or more) configured to generate predetermined spectral ranges of light from a light source and one or more (e.g., three or more) light detection modules configured to receive each of the predetermined spectral ranges of light, the light detection modules having a plurality of photodetectors and an optical component that conveys light having a predetermined sub-spectral range to the photodetectors. In embodiments, systems include a plurality of light detection modules, such as where the number of light detection modules in the plurality of light detection modules ranges from 2 to 8, such as 2 to 6. In certain instances, the wavelength separator is a prism, dichroic mirror or a diffraction grating. In certain embodiments, systems include three or more wavelength separators that are each configured to pass light having a predetermined spectral range and one or more light detection modules in optical communication with each wavelength separator having a plurality of photodetectors and an optical component that conveys light having a predetermined sub-spectral range to the photodetectors. In some embodiments, the wavelength separators are configured to convey light between each other. The wavelength separators may be positioned along a single plane or along two or more parallel planes. In certain embodiments, the wavelength separators are positioned in a polygonal configuration, such as a pentagonal or hexagonal configuration. In embodiments, the wavelength separators are configured to pass light of a predetermined spectral range. In some embodiments, the wavelength separators are configured to pass light having wavelengths that range from 200 nm to 1200 nm, such as from 360 nm to 960 nm. In some embodiments, the wavelength separators are each configured to pass light having a spectral range that spans from 75 nm to 150 nm. In certain instances, the wavelength separators are each configured to pass light having a spectral range that spans 100 nm (e.g., pass light having wavelengths that range from 360 nm to 460 nm).

Particle analysis systems of interest include one or more light detection modules in optical communication with each wavelength separator. In embodiments, each light detection module includes a plurality of photodetectors and an optical component configured to convey light having a predetermined sub-spectral range to the photodetectors. In some embodiments, each optical component is configured to pass light having a sub-spectral range of from 5 nm to 50 nm to each photodetector, such as a sub-spectral range of about 20 nm to each photodetector. The photodetectors and optical components may be positioned in each light detection module along a single plane or along two or more parallel planes. In certain embodiments, the photodetectors and optical components are positioned in a polygonal configuration, such as a hexagonal, heptagonal or octagonal configuration in each light detection module. Light detection modules of interest include a clamp for immobilizing the photodetectors positioned therein (e.g., as described above). Where systems include multiple light detection modules, each module may include one or more respective clamps.

In some embodiments, light from each wavelength separator is conveyed to each light detection module by an optical collection system. Each optical collection system may be any suitable light collection protocol that collects the spectral range of light passed by the wavelength separator and directs the light to the light detection module. In some embodiments, the optical collection system includes fiber optics, such as a fiber optics light relay bundle. In other embodiments, the optical collection system is a free-space light relay system.

Figure 6:
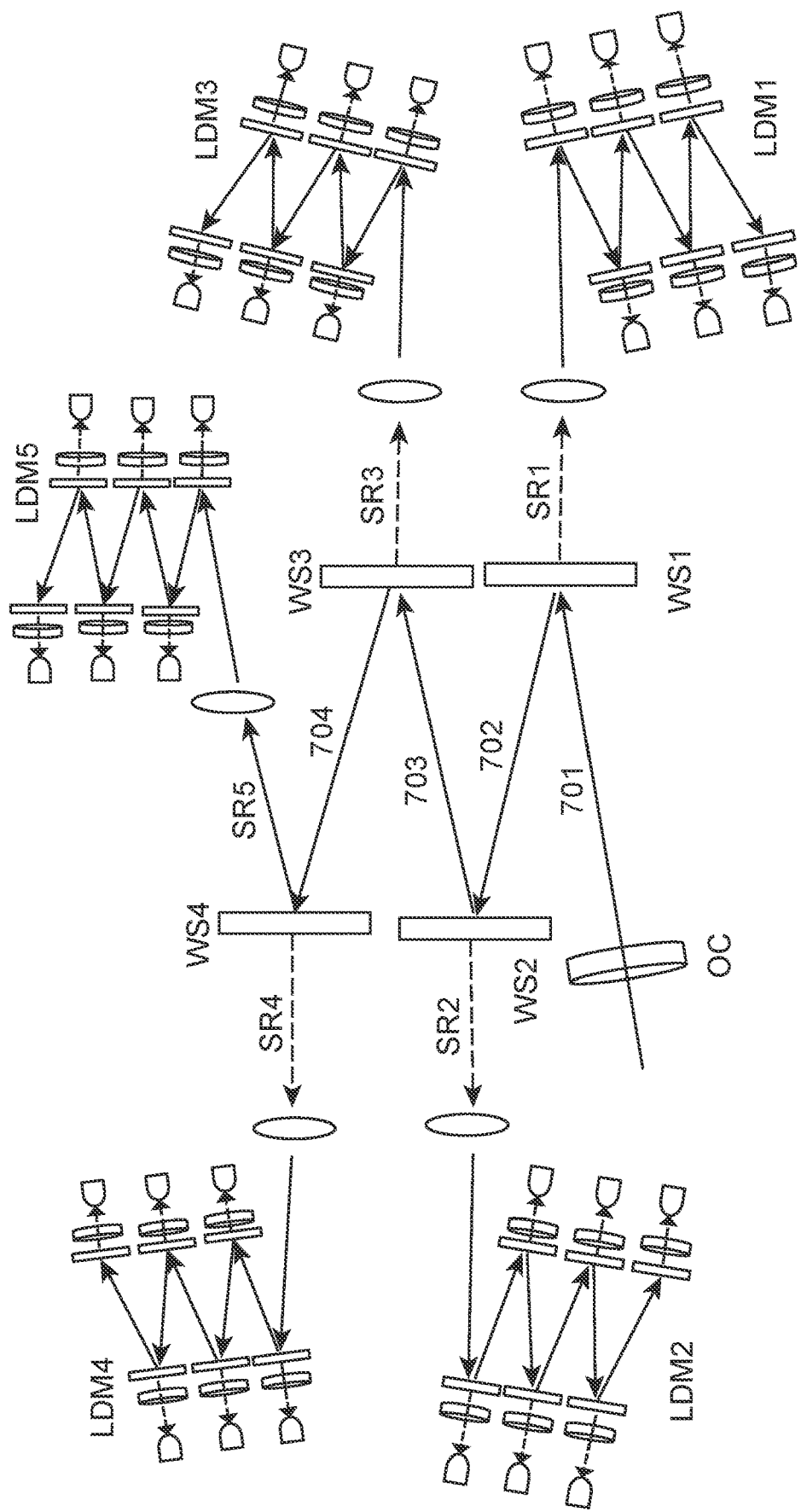
FIG. 6 depicts a schematic diagram of a clustered wavelength division light detection system according to certain embodiments.

FIG. 6 depicts a particle analysis system having a plurality of wavelength separators and light detection modules according to certain embodiments. Light from a sample is conveyed through an optical collection system OC having an optical component configured to pass light having a set of wavelengths 601 to a first wavelength separator WS1 that is configured to pass a first spectral range of light SR1 and convey light having a set of wavelengths 602 to a second wavelength separator WS2. The light of spectral range SR1 is conveyed to a first light detection module LDM1. The second wavelength separator WS2 is configured to pass a second spectral range of light SR2 and convey light having a set of wavelengths 603 to a third wavelength separator WS3. The light of spectral range SR2 is conveyed to a second light detection module LDM2. The third wavelength separator WS3 is configured to pass a third spectral range of light SR3 and convey light having a set of wavelengths 604 to a fourth wavelength separator WS4. The light of spectral range SR3 is conveyed to a third light detection module LDM3. The fourth wavelength separator WS4 is configured to pass a fourth spectral range of light SR4 and convey light having a fifth spectral range of light SR5 to a fifth light detection module LDM5. The light of spectral range SR4 is conveyed to a fourth light detection module LDM4. In this embodiment, each of spectral ranges of light SR1, SR2, SR3, SR4 and SR5 are conveyed to light detection modules, LDM1, LDM2, LDM3, LDM4 and LDM5, respectively, which have a back-and-forth zig-zag configuration.

Any of the optical components depicted in FIG. 6 may be operably coupled to a mounting block via the clamps described herein. For example, in some cases, each of wavelength separators WS1-WS4 may be immobilized by an individual clamp (i.e., such that there is one clamp per wavelength separator). In addition, the optical components present within each of LDM1-LDM4 may be immobilized by a clamp (e.g., as discussed above with respect to FIG. 5)

As discussed above, aspects of the subject flow cytometers include a flow cell configured to propagate particles in a flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, such as 0.2 to 3.0 mm, such as 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-sectional shape of the sample injection tube. For example, the orifice of the sample injection port may include a beveled tip having a bevel angle ranging from 1 degree to 10 degrees, such as from 2 degrees to 9 degrees, such as from 3 degrees to 8 degrees, such as from 4 degrees to 7 degrees and including a bevel angle of 5 degrees.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec to 2500 μL/sec, such as 50 μL/sec to 1000 μL/sec, and including 75 μL/sec or more to 750 μL/sec.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including from 10 nL/min to 50 nL/min. In certain embodiments, the flow rate of the flow stream is from 5 nL/min to 6 nL/min.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5): 502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 7:
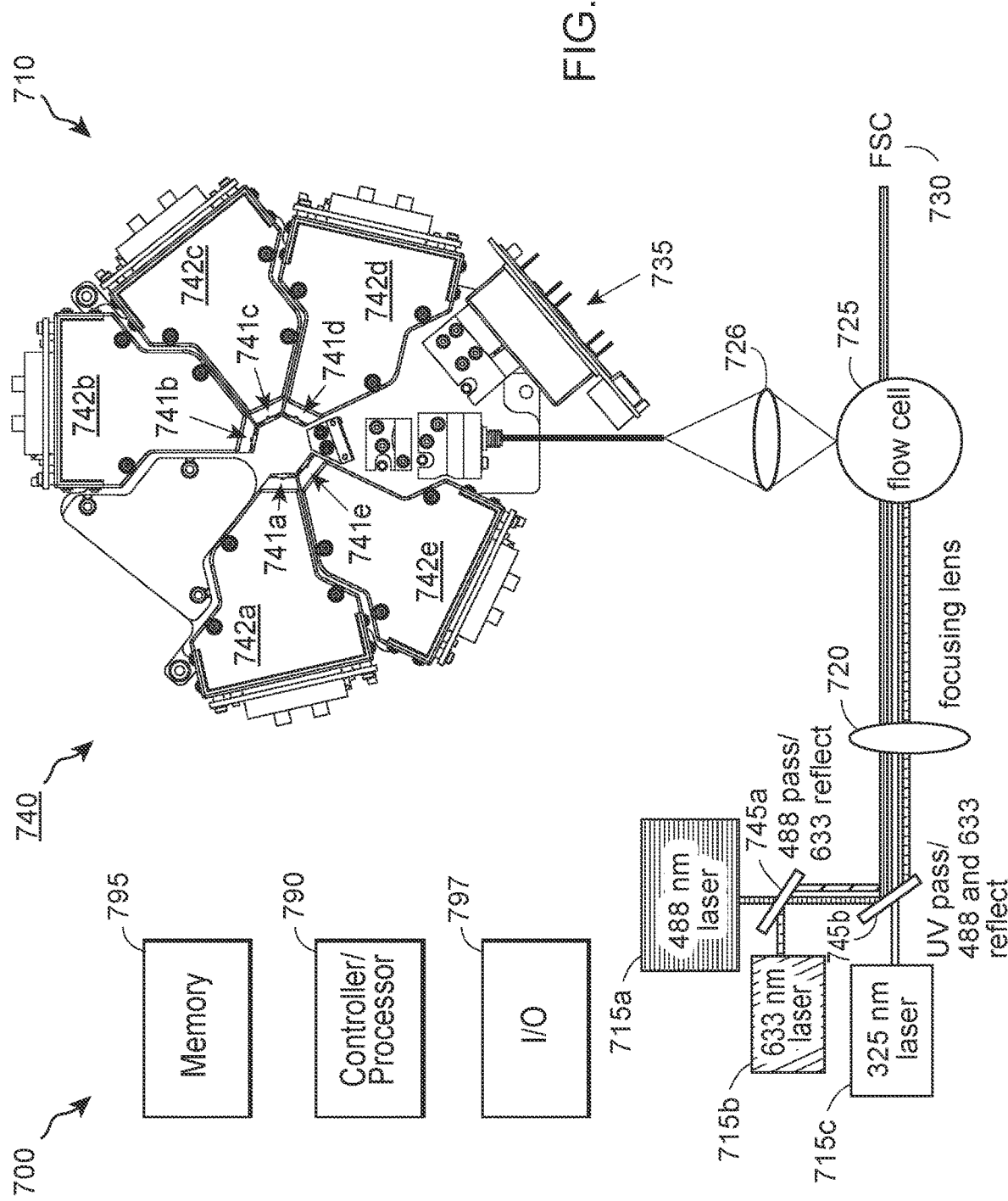
FIG. 7 depicts a functional block diagram of a flow cytometric system according to certain embodiments.

FIG. 7 shows a system 700 for flow cytometry in accordance with an illustrative embodiment of the present invention. The system 700 includes a flow cytometer 710, a controller/processor 790 and a memory 795. The flow cytometer 710 includes one or more excitation lasers 715a-715c, a focusing lens 720, a flow cell 725, a forward-scatter photodetector 730, a side-scatter photodetector 735, a collection lens 726, and a light detection system 740.

The excitation lasers 715a-c emit light in the form of a laser beam. The wavelengths of the laser beams emitted from excitation lasers 715a-715c are 488 nm, 633 nm, and 325 nm, respectively, in the example system of FIG. 7. The laser beams are first directed through one or more of beam splitters 745a and 745b. Beam splitter 745a transmits light at 488 nm and reflects light at 633 nm. Beam splitter 745b transmits UV light (light with a wavelength in the range of 10 to 400 nm) and reflects light at 488 nm and 633 nm.

The laser beams are then directed to a focusing lens 720, which focuses the beams onto the portion of a fluid stream where particles of a sample are located, within the flow cell 725. The flow cell is part of a fluidics system which directs particles, typically one at a time, in a stream to the focused laser beam for interrogation. The flow cell 725 can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward-scatter photodetector 730, the side-scatter photodetector 735, and the light detection system 740.

The forward-scatter photodetector 730 is positioned slightly off axis from the direct beam through the flow cell and is configured to detect diffracted light, the excitation light that travels through or around the particle in mostly a forward direction. The intensity of the light detected by the forward-scatter photodetector is dependent on the overall size of the particle. The forward-scatter photodetector can include a photodiode. The side-scatter photodetector 735 is configured to detect refracted and reflected light from the surfaces and internal structures of the particle that tends to increase with increasing particle complexity of structure. The side-scatter photodetector 735 can include photomultiplier tubes. Light detection system 740 includes six wavelength separators 741a, 741b, 741c, 741d, 741e and 741f. Each wavelength separator is optically coupled to a light detection module, 742a, 742b, 742c, 742d, 742e and 742f, respectively. Each light detection module includes a plurality of photodetectors (e.g., as described above) The signals detected at the forward-scatter photodetector 730, the side-scatter photodetector 735 and the photodetectors within light detection modules 742a-742f can be converted to electronic signals (voltages) by the photodetectors. This data can provide information about the sample.

Any of the optical components in the system of FIG. 7 may be operably coupled to a mounting block via a clamp described herein. For example, one or more of wavelength separators 741a-741f may be operably coupled via the subject clamps to mounting blocks in light detection modules 742a-742f, respectively. In addition, one or more of the optical components present within light detection modules 742a-742f may similarly be operably coupled to mounting blocks via clamps (e.g., as described above).

One of skill in the art will recognize that a flow cytometer in accordance with an embodiment of the present invention is not limited to the flow cytometer depicted in FIG. 7, but can include any flow cytometer known in the art. For example, a flow cytometer may have any number of lasers, beam splitters, filters, and photodetectors at various wavelengths and in various different configurations.

In operation, cytometer operation is controlled by a controller/processor 790, and the measurement data from the photodetectors can be stored in the memory 795 and processed by the controller/processor 790. Although not shown explicitly, the controller/processor 790 is coupled to the photodetectors to receive the output signals therefrom, and may also be coupled to electrical and electromechanical components of the flow cytometer 710 to control the lasers, fluid flow parameters, and the like. Input/output (I/O) capabilities 797 may be provided also in the system. The memory 795, controller/processor 790, and I/O 797 may be entirely provided as an integral part of the flow cytometer 710. In such an embodiment, a display may also form part of the I/O capabilities 797 for presenting experimental data to users of the cytometer 710. Alternatively, some or all of the memory 795 and controller/processor 790 and I/O capabilities may be part of one or more external devices such as a general purpose computer. In some embodiments, some or all of the memory 795 and controller/processor 790 can be in wireless or wired communication with the cytometer 710. The controller/processor 790 in conjunction with the memory 795 and the I/O 797 can be configured to perform various functions related to the preparation and analysis of a flow cytometer experiment.

Different fluorescent molecules used for a flow cytometer experiment will emit light in their own characteristic wavelength bands. The particular fluorescent labels used for an experiment and their associated fluorescent emission bands may be selected to generally coincide with the filter windows of the photodetectors. The I/O 797 can be configured to receive data regarding a flow cytometer experiment having a panel of fluorescent labels and a plurality of cell populations having a plurality of markers, each cell population having a subset of the plurality of markers. The I/O 797 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 795. The controller/processor 790 can be configured to evaluate one or more assignments of labels to markers.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflection plates, such as described in U.S. Patent Publication No. 2017/0299493, filed on Mar. 28, 2017, the disclosure of which is incorporated herein by reference.

Figure 8:
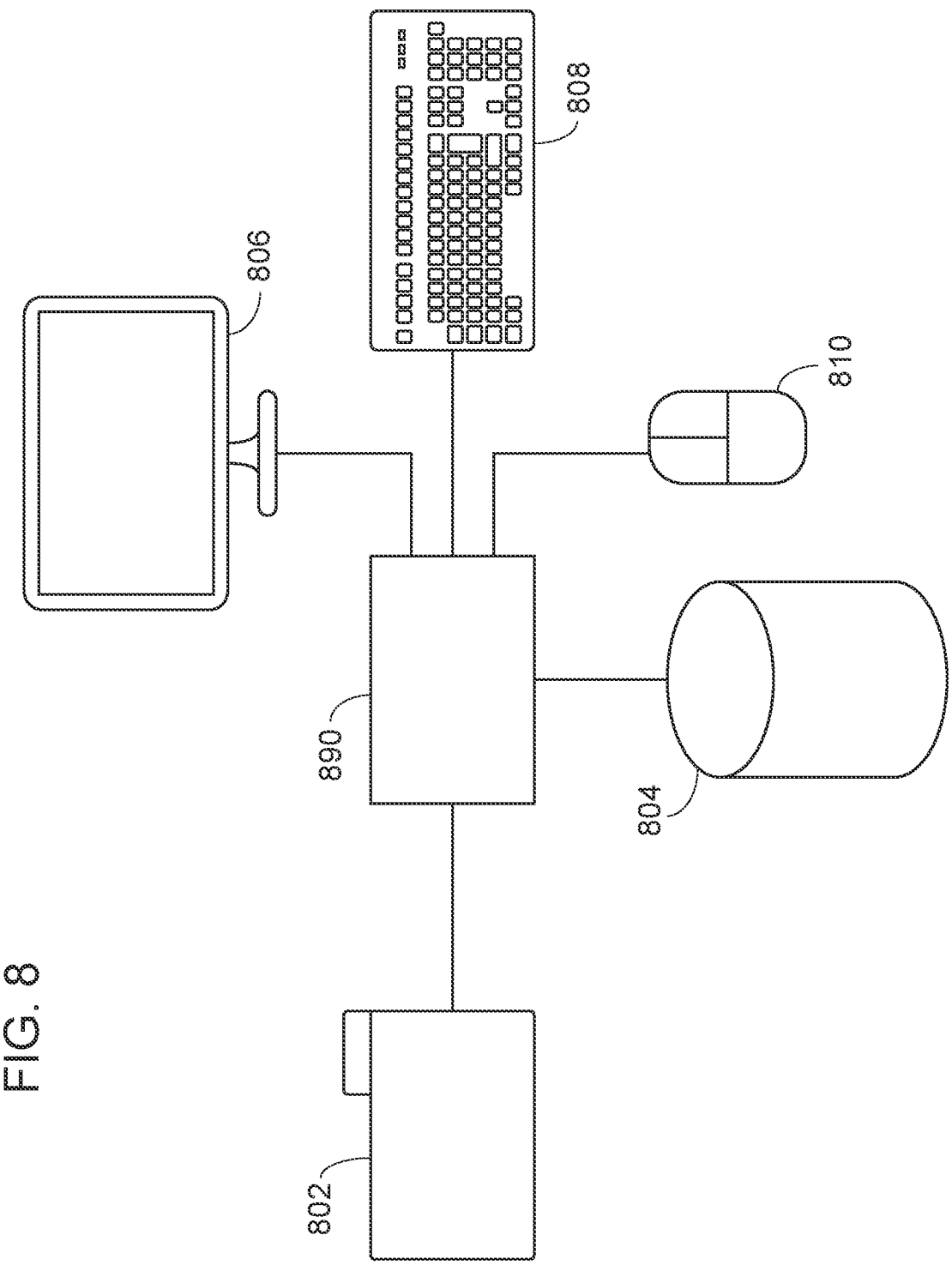
FIG. 8 depicts a sorting control system according to certain embodiments.

FIG. 8 shows a functional block diagram for one example of a system, such as a processor 800, for analyzing and displaying biological events. A processor 800 can be configured to implement a variety of processes for controlling graphic display of biological events.

A flow cytometer or sorting system 802 can be configured to acquire biological event data. For example, a flow cytometer can generate flow cytometric event data (e.g., particle-modulated light data). The flow cytometer 802 can be configured to provide biological event data to the processor 800. A data communication channel can be included between the flow cytometer 802 and the processor 800. The biological event data can be provided to the processor 800 via the data communication channel.

The processor 800 can be configured to receive biological event data from the flow cytometer 802. The biological event data received from the flow cytometer 802 can include flow cytometric event data. The processor 800 can be configured to provide a graphical display including a first plot of biological event data to a display device 806. The processor 800 can be further configured to render a region of interest as a gate around a population of biological event data shown by the display device 806, overlaid upon the first plot, for example. In some embodiments, the gate can be a logical combination of one or more graphical regions of interest drawn upon a single parameter histogram or bivariate plot. In some embodiments, the display can be used to display particle parameters or saturated photodetector data.

The processor 800 can be further configured to display the biological event data on the display device 806 within the gate differently from other events in the biological event data outside of the gate. For example, the processor 800 can be configured to render the color of biological event data contained within the gate to be distinct from the color of biological event data outside of the gate. The display device 806 can be implemented as a monitor, a tablet computer, a smartphone, or other electronic device configured to present graphical interfaces.

The processor 800 can be configured to receive a gate selection signal identifying the gate from a first input device. For example, the first input device can be implemented as a mouse 810. The mouse 810 can initiate a gate selection signal to the processor 800 identifying the gate to be displayed on or manipulated via the display device 806 (e.g., by clicking on or in the desired gate when the cursor is positioned there). In some implementations, the first device can be implemented as the keyboard 808 or other means for providing an input signal to the processor 800 such as a touchscreen, a stylus, an optical photodetector, or a voice recognition system. Some input devices can include multiple inputting functions. In such implementations, the inputting functions can each be considered an input device. For example, as shown in FIG. 8, the mouse 810 can include a right mouse button and a left mouse button, each of which can generate a triggering event.

The triggering event can cause the processor 800 to alter the manner in which the data is displayed, which portions of the data is actually displayed on the display device 806, and/or provide input to further processing such as selection of a population of interest for particle sorting.

In some embodiments, the processor 800 can be configured to detect when gate selection is initiated by the mouse 810. The processor 800 can be further configured to automatically modify plot visualization to facilitate the gating process. The modification can be based on the specific distribution of biological event data received by the processor 800. In some embodiments, the processor 800 expands the first gate such that a second gate is generated (e.g., as discussed above).

The processor 800 can be connected to a storage device 804. The storage device 804 can be configured to receive and store biological event data from the processor 800. The storage device 804 can also be configured to receive and store flow cytometric event data from the processor 800. The storage device 804 can be further configured to allow retrieval of biological event data, such as flow cytometric event data, by the processor 800.

The display device 806 can be configured to receive display data from the processor 800. The display data can comprise plots of biological event data and gates outlining sections of the plots. The display device 806 can be further configured to alter the information presented according to input received from the processor 800 in conjunction with input from the flow cytometer 802, the storage device 804, the keyboard 808, and/or the mouse 810.

In some implementations the processor 800 can generate a user interface to receive example events for sorting. For example, the user interface can include a mechanism for receiving example events or example images. The example events or images or an example gate can be provided prior to collection of event data for a sample or based on an initial set of events for a portion of the sample.

Figure 9A:
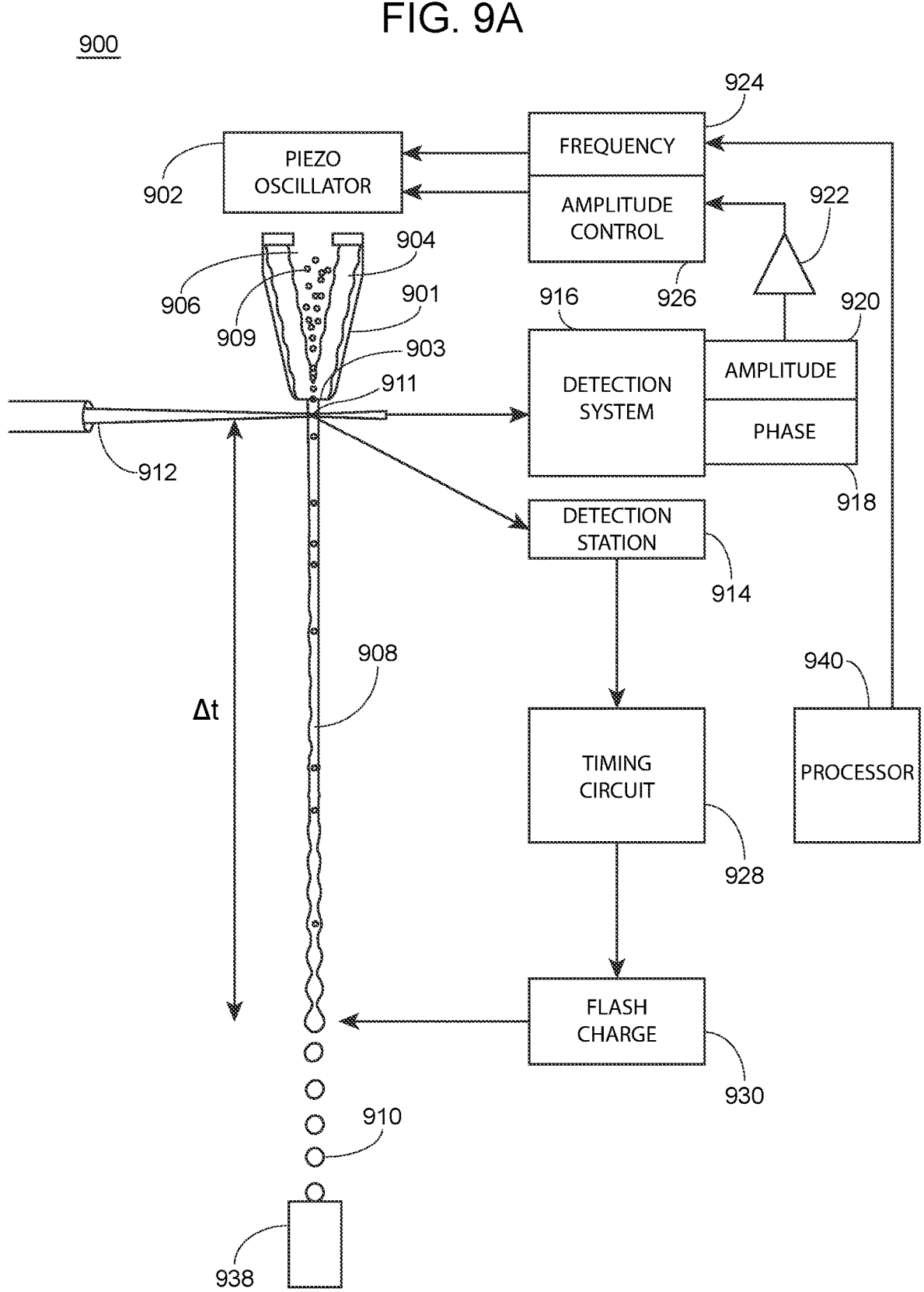
FIG. 9A-B depict schematic drawings of a particle sorter system according to certain embodiments.

FIG. 9A is a schematic drawing of a particle sorter system 900 (e.g., the flow cytometer 802 in FIG. 8) in accordance with one embodiment presented herein. In some embodiments, the particle sorter system 900 is a cell sorter system. As shown in FIG. 9A, a drop formation transducer 902 (e.g., piezo-oscillator) is coupled to a fluid conduit 901, which can be coupled to, can include, or can be, a nozzle 903. Within the fluid conduit 901, sheath fluid 904 hydrodynamically focuses a sample fluid 906 comprising particles 909 into a moving fluid column 908 (e.g. a stream). Within the moving fluid column 908, particles 909 (e.g., cells) are lined up in single file to cross a monitored area 911 (e.g., where laser-stream intersect), irradiated by an irradiation source 912 (e.g., a laser). Vibration of the drop formation transducer 902 causes moving fluid column 908 to break into a plurality of drops 910, some of which contain particles 909.

In operation, a detection station 914 (e.g., an event detector) identifies when a particle of interest (or cell of interest) crosses the monitored area 911. Detection station 914 feeds into a timing circuit 928, which in turn feeds into a flash charge circuit 930. At a drop break off point, informed by a timed drop delay (Δt), a flash charge can be applied to the moving fluid column 908 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 9A, the drops can be collected in a drain receptacle 938.

A detection system 916 (e.g. a drop boundary detector) serves to automatically determine the phase of a drop drive signal when a particle of interest passes the monitored area 911. An exemplary drop boundary detector is described in U.S. Pat. No. 7,679,039, which is incorporated herein by reference in its entirety. The detection system 916 allows the instrument to accurately calculate the place of each detected particle in a drop. The detection system 916 can feed into an amplitude signal 920 and/or phase 918 signal, which in turn feeds (via amplifier 922) into an amplitude control circuit 926 and/or frequency control circuit 924. The amplitude control circuit 926 and/or frequency control circuit 924, in turn, controls the drop formation transducer 902. The amplitude control circuit 926 and/or frequency control circuit 924 can be included in a control system.

In some implementations, sort electronics (e.g., the detection system 916, the detection station 914 and a processor 940) can be coupled with a memory configured to store the detected events and a sort decision based thereon. The sort decision can be included in the event data for a particle. In some implementations, the detection system 916 and the detection station 914 can be implemented as a single detection unit or communicatively coupled such that an event measurement can be collected by one of the detection system 916 or the detection station 914 and provided to the non-collecting element.

Figure 9B:
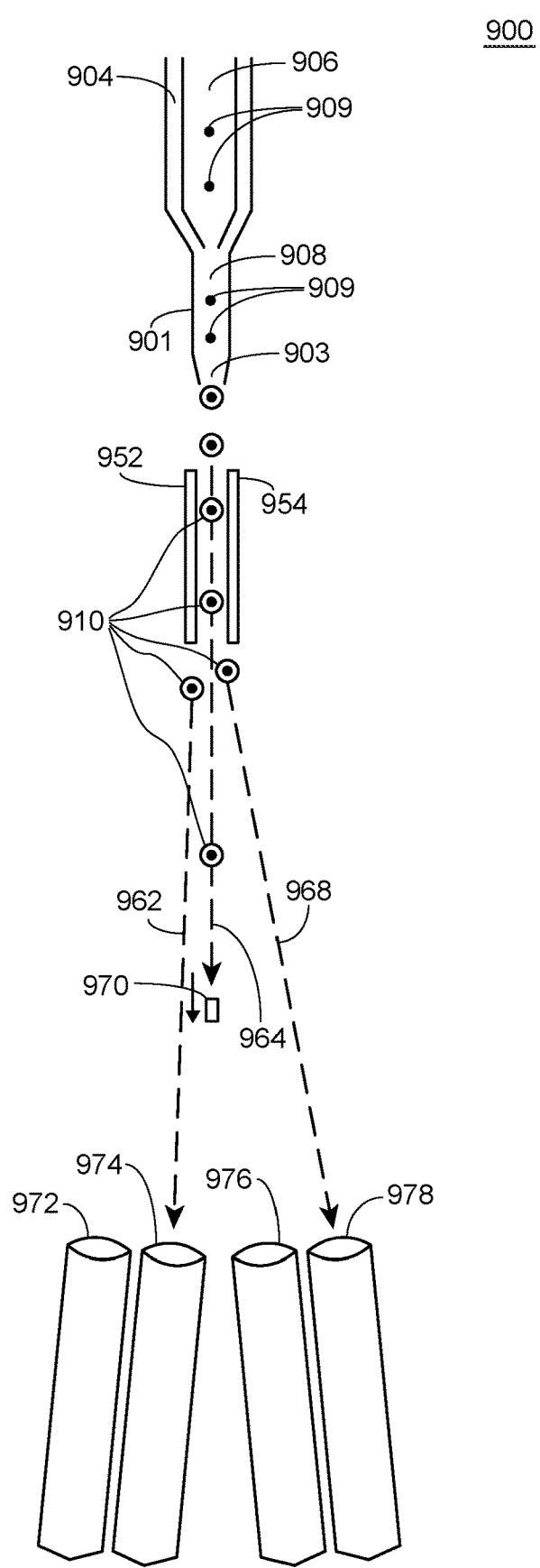

FIG. 9B is a schematic drawing of a particle sorter system, in accordance with one embodiment presented herein. The particle sorter system 900 shown in FIG. 9B, includes deflection plates 952 and 954. A charge can be applied via a stream-charging wire in a barb. This creates a stream of droplets 910 containing particles 909 for analysis. The particles can be illuminated with one or more light sources (e.g., lasers) to generate light scatter and fluorescence information. The information for a particle is analyzed such as by sorting electronics or other detection system (not shown in FIG. 9B). The deflection plates 952 and 954 can be independently controlled to attract or repel the charged droplet to guide the droplet toward a destination collection vessel (e.g., one of 972, 974, 976, or 978). As shown in FIG. 9B, the deflection plates 952 and 954 can be controlled to direct a particle along a first path 962 toward the vessel 974 or along a second path 968 toward the vessel 978. If the particle is not of interest (e.g., does not exhibit scatter or illumination information within a specified sort range), deflection plates may allow the particle to continue along a flow path 964. Such uncharged droplets may pass into a waste receptacle such as via aspirator 970.

The sorting electronics can be included to initiate collection of measurements, receive fluorescence signals for particles, and determine how to adjust the deflection plates to cause sorting of the particles. Example implementations of the embodiment shown in FIG. 9B include the BD FACSAria™ line of flow cytometers commercially provided by Becton, Dickinson and Company (Franklin Lakes, NJ).

Methods of Analyzing a Sample

Aspects of the invention further include methods of analyzing a sample. Methods of interest include introducing a sample into a particle analysis system having a light source and one or more light detection modules. Light detection modules for use in the instant methods include a mounting block, an optical component for modulating a beam of light, and a clamp operably coupling the optical component to the mounting block. Clamps of interest for the subject methods include a frame and one or more flexure tabs attached thereto. Light detection modules may include any convenient number of optical components. In certain cases, the light detection modules include a single optical component. In other cases, light detection modules include a plurality of optical components, such as where the number of optical components in the plurality of optical components ranges from 2 to 8, such as 2 to 6, and including 2 to 4. The particle analysis system may include any convenient number of light detection modules. In some instances, the system includes a single light detection module. In other embodiments, the light detection module includes a plurality of light detection modules, such as where the number of light detection modules in the plurality of light detection modules ranges from 2 to 8, such as 2 to 6.

In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for characterized according to a variety of parameters, such as a phenotypic characteristic identified via the attachment of a particular fluorescent label to cells of interest. In some embodiments, the system is configured to deflect analyzed droplets that are determined to include a target cell. A variety of cells may be characterized using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chloride (XeCl) excimer laser or xenon-fluorine (XeF) excimer laser or a combination thereof. In other instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

As discussed above, in embodiments light from the irradiated sample is conveyed to a light detection system as described herein and measured by one or more photodetectors. In practicing the subject methods, light from the sample is conveyed to three or more wavelength separators that are each configured to pass light having a predetermined spectral range. The spectral ranges of light from each of the wavelength separators are conveyed to one or more light detection modules having optical components that are configured to convey light having a predetermined sub-spectral range to the photodetectors.

Light may be measured with the light detection systems continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include adjusting the light before detecting the light with the subject light detection systems. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

Methods of interest may further include employing particles in research, laboratory testing, or therapy. In some embodiments, the subject methods include obtaining individual cells prepared from a target fluidic or tissue biological sample. For example, the subject methods include obtaining cells from fluidic or tissue samples to be used as a research or diagnostic specimen for diseases such as cancer. Likewise, the subject methods include obtaining cells from fluidic or tissue samples to be used in therapy. A cell therapy protocol is a protocol in which viable cellular material including, e.g., cells and tissues, may be prepared and introduced into a subject as a therapeutic treatment. Conditions that may be treated by the administration of the flow cytometrically sorted sample include, but are not limited to, blood disorders, immune system disorders, organ damage, etc.

A typical cell therapy protocol may include the following steps: sample collection, cell isolation, genetic modification, culture, and expansion in vitro, cell harvesting, sample volume reduction and washing, bio-preservation, storage, and introduction of cells into a subject. The protocol may begin with the collection of viable cells and tissues from source tissues of a subject to produce a sample of cells and/or tissues. The sample may be collected via any suitable procedure that includes, e.g., administering a cell mobilizing agent to a subject, drawing blood from a subject, removing bone marrow from a subject, etc. After collecting the sample, cell enrichment may occur via several methods including, e.g., centrifugation based methods, filter based methods, elutriation, magnetic separation methods, fluorescence-activated cell sorting (FACS), and the like. In some cases, the enriched cells may be genetically modified by any convenient method, e.g., nuclease mediated gene editing. The genetically modified cells can be cultured, activated, and expanded in vitro. In some cases, the cells are preserved, e.g., cryopreserved, and stored for future use where the cells are thawed and then administered to a patient, e.g., the cells may be infused in the patient.

Methods of Assembling a Light Detection Module

Aspects of the disclosure further include methods of assembling a light detection module having an optical component. Methods of interest include attaching to a mounting block a clamp for operably coupling the optical component to the mounting block. Clamps of interest for the subject methods include a frame and one or more flexure tabs attached to the frame (e.g., as discussed above). Methods may include positioning any convenient number of optical components within the light detection module. In some instances, methods include positioning a single optical component within the light detection module. In other instances, methods include positioning a plurality of optical components within the light detection module, such as where the number of optical components in the plurality of optical components ranges from 2 to 8, such as 2 to 6 and including 2 to 4. Certain embodiments of the method include attaching a plurality of (e.g., ranging from 2 to 4) clips to mounting blocks.

Methods of interest additionally include securing clamps to one or more mounting blocks via an attachment mechanism. In some cases, the attachment mechanism includes an opening configured to receive a screw. The clamp may include any convenient number of openings. In some embodiments, the clamp includes a single opening. In other embodiments, the clamp includes a plurality of openings, such as where the number of openings ranges from 2 to 12 openings, such as 2 to 10 and, including 2 to 8 openings. In some embodiments, the clamp includes 8 openings. Methods according to embodiments of the invention additionally include securing the mounting block via one or more screws.

In other cases, the attachment mechanism includes one or more clips. Clips of interest may include a protrusion from the clamp that is configured to engage in a mating relationship with a complementarily sized groove in the mounting block. Where the clamp includes a clip, the clip may be configured to engage the groove as the clamp is positioned on the detection module and, once engaged, prevent the clamp from being lifted off the detection module. The subject clamps may include any convenient number of clips. In some instances, the clamps include a single clip configured to mate with a single groove in the detection module. In additional embodiments, the clamp includes a plurality of clips, such as where the number of clips ranges from 2 to 4.

Computer Controlled Systems

Aspects of the present disclosure further include computer-controlled systems, where the systems include one or more computers for complete automation or partial automation. In some embodiments, systems include a computer having a non-transitory computer readable storage medium with a computer program stored thereon, where the computer program when loaded on the computer includes instructions for analyzing data from one or more photodetectors (e.g., photodetectors in a light detection module).

In embodiments, the system includes an input module, a processing module, and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400®, i5/OS®, IBM i®, Android™, SGI IRIX®, Oracle Solaris® and others.

FIG. 10 depicts a general architecture of an example computing device 1000 according to certain embodiments. The general architecture of the computing device 1000 depicted in FIG. 10 includes an arrangement of computer hardware and software components. It is not necessary, however, that all of these generally conventional elements be shown in order to provide an enabling disclosure. As illustrated, the computing device 1000 includes a processing unit 1010, a network interface 1020, a computer readable medium drive 1030, an input/output device interface 1040, a display 1050, and an input device 1060, all of which may communicate with one another by way of a communication bus. The network interface 1020 may provide connectivity to one or more networks or computing systems. The processing unit 1010 may thus receive information and instructions from other computing systems or services via a network. The processing unit 1010 may also communicate to and from memory 1070 and further provide output information for an optional display 1050 via the input/output device interface 1040. For example, an analysis software (e.g., data analysis software or program such as FlowJo®) stored as executable instructions in the non-transitory memory of the analysis system can display the flow cytometry event data to a user. The input/output device interface 1040 may also accept input from the optional input device 1060, such as a keyboard, mouse, digital pen, microphone, touch screen, gesture recognition system, voice recognition system, gamepad, accelerometer, gyroscope, or other input device.

The memory 1070 may contain computer program instructions (grouped as modules or components in some embodiments) that the processing unit 1010 executes in order to implement one or more embodiments. The memory 1070 generally includes RAM, ROM and/or other persistent, auxiliary or non-transitory computer-readable media. The memory 1070 may store an operating system 1072 that provides computer program instructions for use by the processing unit 1010 in the general administration and operation of the computing device 1000. Data may be stored in data storage device 1090. The memory 1070 may further include computer program instructions and other information for implementing aspects of the present disclosure.

Utility

The subject light detection systems find use where the characterization of a sample by optical properties, in particular where low levels of light are collected, is desired. In some embodiments, the systems and methods described herein find use in flow cytometry characterization of biological samples labelled with fluorescent tags. In other embodiments, the systems and methods find use in spectroscopy of transmitted or scattered light. In addition, the subject systems and methods find use in increasing the obtainable signal from light collected from a sample (e.g., in a flow stream). In certain instances, the present disclosure finds use in enhancing measurement of light collected from a sample that is irradiated in a flow stream in a flow cytometer. For example, the present invention may be employed to reduce noise caused by undesirable movement of optical components during operation. Embodiments of the present disclosure find use where enhancing the effectiveness of emission measurements in flow cytometry are desired, such as in research and high throughput laboratory testing. The present disclosure also finds use where it is desirable to provide a flow cytometer with improved cell sorting accuracy, enhanced particle collection, reduced energy consumption, particle charging efficiency, more accurate particle charging and enhanced particle deflection during cell sorting. The present disclosure may additionally find use in increasing the ease with which a particle analyzer may be assembled.

Embodiments of the invention find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Kits

Aspects of the invention further include kits, where kits include one or more optical components (e.g., dichroic mirrors, bandpass filters, beam splitters or the like) and a clamp for operably coupling the optical component(s) to a mounting block. Clamps of interest for the subject kits include a frame and a one or more flexure tabs attached to the frame. Embodiments of the subject kits include a plurality of clamps. In some embodiments, kits include one or more mounting blocks. Kits may also include an optical collection component, such as fiber optics (e.g., fiber optics relay bundle) or components for a free-space relay system. In some instances, kits further include one or more photodetectors, such as avalanche photodiodes.

In addition to the above components, the subject kits may further include (in some embodiments) instructions, e.g., for assembling a light detection module via one or more clamps. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A system comprising:
    a light source; and
    a light detection module comprising:
        a mounting block;
        an optical component for modulating a beam of light; and
        a clamp operably coupling the optical component to the mounting block, the clamp comprising:
            a rectangular frame surrounding an open space, wherein the frame comprises a first plurality of flexure tabs on a top portion of the frame and a second plurality of flexure tabs on a bottom portion of the frame and flexure tabs in the plurality of flexure tabs located adjacent to a corner of the frame are configured to contact a smaller surface area of the optical component relative to neighboring flexure tabs.

2. The system according to claim 1, wherein the flexure tabs comprises a bent portion for contacting the optical component.

3. The system according to claim 1, wherein the frame comprises a cutout for preventing the obscuration of light exiting the optical component.

4. The system according to claim 1, further comprising an attachment mechanism configured to secure the clamp to the mounting block.

5. The system according to claim 4, wherein the attachment mechanism comprises an opening in the frame configured to receive a screw.

6. The system according to claim 5, wherein the attachment mechanism comprises a plurality of openings.

7. The system according to claim 1, wherein the optical component comprises a mirror.

8. The system according to claim 7, wherein the mirror is an elongated mirror.

9. The system according to claim 7, wherein the mirror is a dichroic mirror.

10. The system according to claim 1, wherein the optical component is configured to pass light having a predetermined spectral range.

11. The system according to claim 1, wherein the clamp operably couples a plurality of optical components to the mounting block.

12. The system according to claim 1, wherein the light detection module comprises:
    a plurality of mounting blocks; and
    a clamp operably coupling an optical component to each mounting block in the plurality of mounting blocks.

13. The system according to claim 1, wherein the light detection module is a plurality of light detection modules, each light detection model comprising:
    a mounting block;
    an optical component for modulating a beam of light; and
    a clamp operably coupling the optical component to the mounting block and comprising a frame and a plurality of flexure tabs attached to the frame.

14. The system according to claim 13, wherein the optical components are configured to convey light between the light detection modules.

15. The system according to claim 1, wherein the system is a particle analyzer.

16. The system according to claim 15, wherein the system is a flow cytometer.

* * * * *